United States Patent
Beyrard

(10) Patent No.: US 8,494,110 B2
(45) Date of Patent: Jul. 23, 2013

(54) X-RAY IMAGING METHOD AND DEVICE WITH THREE-DIMENSIONAL PROCESSING

(76) Inventor: Norbert Beyrard, Divonne-les-bains (FR)

( * ) Notice: Subject to any disclaimer, the term of this patent is extended or adjusted under 35 U.S.C. 154(b) by 4 days.

(21) Appl. No.: 13/376,462

(22) PCT Filed: Jun. 18, 2010

(86) PCT No.: PCT/EP2010/058616
§ 371 (c)(1),
(2), (4) Date: Dec. 6, 2011

(87) PCT Pub. No.: WO2011/000718
PCT Pub. Date: Jan. 6, 2011

(65) Prior Publication Data
US 2012/0134461 A1    May 31, 2012

(30) Foreign Application Priority Data
Jul. 3, 2009  (FR) ...................... 09 03261

(51) Int. Cl.
*A61B 6/00*    (2006.01)
(52) U.S. Cl.
USPC .................................. 378/4; 378/9
(58) Field of Classification Search
USPC ........................................ 378/4, 9
See application file for complete search history.

(56) References Cited

U.S. PATENT DOCUMENTS

| | | | | |
|---|---|---|---|---|
| 4,349,740 A | * | 9/1982 | Grassmann et al. | 378/25 |
| 4,411,012 A | * | 10/1983 | Pfeiler et al. | 378/17 |
| 4,888,794 A | * | 12/1989 | Haaker et al. | 378/41 |
| 5,173,852 A | * | 12/1992 | Lonn | 378/9 |
| 5,218,533 A | * | 6/1993 | Schanen | 378/9 |
| 5,473,655 A | * | 12/1995 | Hu | 378/4 |
| 7,396,162 B1 | * | 7/2008 | Edic et al. | 378/207 |
| 7,639,774 B2 | * | 12/2009 | De Man et al. | 378/9 |
| 7,656,992 B2 | * | 2/2010 | Bruder et al. | 378/8 |
| 7,778,383 B2 | * | 8/2010 | Koehler et al. | 378/5 |
| 2011/0243297 A1 | * | 10/2011 | Beyrard et al. | 378/4 |

FOREIGN PATENT DOCUMENTS

| | | |
|---|---|---|
| FR | 2888374 | 1/2007 |
| WO | 2007/006560 | 1/2007 |

* cited by examiner

*Primary Examiner* — Alexander H Taningco
(74) *Attorney, Agent, or Firm* — Sturm & Fix LLP

(57) ABSTRACT

X-ray imaging method, in which the data ($c^{(a)}$, $\rho^{(b)}$) are processed by a programmed computer using the following formula:

$$C = \frac{\rho^{(b)}}{n} + \frac{c^{(a)}}{n} - \frac{1}{2\frac{2}{n}}\left(\sum_{k=1}^{n} c_k^{(a)} + \sum_{u=1}^{n} \rho_u^{(b)}\right)$$

to calculate a value (C) of the attenuation coefficient at a point (P0) of a set of points {P0}, for a given pair of said angular positions $\theta_a$ and $\theta_b$, in order to obtain an image representing an X-ray attenuation coefficient for said set of points {P0} of the body (3).
According to the invention, the computer is programmed to perform the following stages:
(1) pre-calculate the positions on the detector (9) of a first impact point $T^{(a)}$ of a ray i and a second impact point $R^{(b)}$ of a ray j,
(2) pre-calculate the positions on the detector of first and second load calculation lines, along detection points $T_{p,k}$; k=1→n; p=1→m and $R_{q,u}$; u=1→n; q=1→m, and
(3) calculate the value of the attenuation coefficient at point P0 in the volume irradiated by using the pre-calculated positions of the first and second impact points $T^{(a)}$; $R^{(b)}$ and the pre-calculated first p and second q load calculation lines $T_{p,k}^{(a)}$; k=1→n; $R_{q,u}^{(b)}$; u=1→n that pass closest to the first and second impact points ($T^{(a)}$; $R^{(b)}$) respectively.

9 Claims, 14 Drawing Sheets

| θ (°) | X (mm) | Y (mm) | Z (mm) | K1 | X1 (mm) | Z1 (mm) | K2 | Y2 (mm) | Z2 (mm) |
|---|---|---|---|---|---|---|---|---|---|
| 47,73 | 10,00 | 11,00 | 20,00 | 1,16 | 11,58 | 23,16 | 1,16 | 12,75 | 23,18 |
| 57,73 | 7,94 | 12,57 | 20,00 | 1,16 | 9,18 | 23,14 | 1,16 | 14,59 | 23,21 |
| 67,73 | 5,63 | 13,76 | 20,00 | 1,16 | 6,51 | 23,12 | 1,16 | 15,99 | 23,25 |
| 77,73 | 3,16 | 14,53 | 20,00 | 1,16 | 3,65 | 23,11 | 1,16 | 16,91 | 23,28 |
| 87,73 | 0,59 | 14,85 | 20,00 | 1,16 | 0,68 | 23,10 | 1,17 | 17,32 | 23,32 |
| 97,73 | -2,00 | 14,73 | 20,00 | 1,16 | -2,31 | 23,11 | 1,17 | 17,21 | 23,36 |
| 107,73 | -4,53 | 14,16 | 20,00 | 1,16 | -5,23 | 23,12 | 1,17 | 16,57 | 23,40 |
| 117,73 | -6,92 | 13,16 | 20,00 | 1,16 | -8,00 | 23,13 | 1,17 | 15,42 | 23,44 |
| 127,73 | -9,10 | 11,76 | 20,00 | 1,16 | -10,53 | 23,15 | 1,17 | 13,80 | 23,48 |
| 137,73 | -11,00 | 10,00 | 20,00 | 1,16 | -12,75 | 23,18 | 1,18 | 11,75 | 23,51 |
| 147,73 | -12,57 | 7,94 | 20,00 | 1,16 | -14,59 | 23,21 | 1,18 | 9,34 | 23,53 |
| 157,73 | -13,76 | 5,63 | 20,00 | 1,16 | -15,99 | 23,25 | 1,18 | 6,63 | 23,55 |
| 167,73 | -14,53 | 3,16 | 20,00 | 1,16 | -16,91 | 23,28 | 1,18 | 3,72 | 23,56 |
| 177,73 | -14,85 | 0,59 | 20,00 | 1,17 | -17,32 | 23,32 | 1,18 | 0,69 | 23,57 |
| 187,73 | -14,73 | -2,00 | 20,00 | 1,17 | -17,21 | 23,36 | 1,18 | -2,35 | 23,56 |
| 197,73 | -14,16 | -4,53 | 20,00 | 1,17 | -16,57 | 23,40 | 1,18 | -5,33 | 23,56 |
| 207,73 | -13,16 | -6,92 | 20,00 | 1,17 | -15,42 | 23,44 | 1,18 | -8,14 | 23,54 |
| 217,73 | -11,76 | -9,10 | 20,00 | 1,17 | -13,80 | 23,48 | 1,18 | -10,70 | 23,52 |
| 227,73 | -10,00 | -11,00 | 20,00 | 1,18 | -11,75 | 23,51 | 1,17 | -12,92 | 23,49 |
| 237,73 | -7,94 | -12,57 | 20,00 | 1,18 | -9,34 | 23,53 | 1,17 | -14,74 | 23,46 |
| 247,73 | -5,63 | -13,76 | 20,00 | 1,18 | -6,63 | 23,55 | 1,17 | -16,11 | 23,42 |
| 257,73 | -3,16 | -14,53 | 20,00 | 1,18 | -3,72 | 23,56 | 1,17 | -16,98 | 23,38 |
| 267,73 | -0,59 | -14,85 | 20,00 | 1,18 | -0,69 | 23,57 | 1,17 | -17,34 | 23,34 |
| 277,73 | 2,00 | -14,73 | 20,00 | 1,18 | 2,35 | 23,56 | 1,17 | -17,16 | 23,30 |
| 287,73 | 4,53 | -14,16 | 20,00 | 1,18 | 5,33 | 23,56 | 1,16 | -16,47 | 23,26 |
| 297,73 | 6,92 | -13,16 | 20,00 | 1,18 | 8,14 | 23,54 | 1,16 | -15,28 | 23,23 |
| 307,73 | 9,10 | -11,76 | 20,00 | 1,18 | 10,70 | 23,52 | 1,16 | -13,64 | 23,19 |
| 317,73 | 11,00 | -10,00 | 20,00 | 1,17 | 12,92 | 23,49 | 1,16 | -11,58 | 23,16 |
| 327,73 | 12,57 | -7,94 | 20,00 | 1,17 | 14,74 | 23,46 | 1,16 | -9,18 | 23,14 |
| 337,73 | 13,76 | -5,63 | 20,00 | 1,17 | 16,11 | 23,42 | 1,16 | -6,51 | 23,12 |
| 347,73 | 14,53 | -3,16 | 20,00 | 1,17 | 16,98 | 23,38 | 1,16 | -3,65 | 23,11 |
| 357,73 | 14,85 | -0,59 | 20,00 | 1,17 | 17,34 | 23,34 | 1,16 | -0,68 | 23,10 |
| 367,73 | 14,73 | 2,00 | 20,00 | 1,17 | 17,16 | 23,30 | 1,16 | 2,31 | 23,11 |
| 377,73 | 14,16 | 4,53 | 20,00 | 1,16 | 16,47 | 23,26 | 1,16 | 5,23 | 23,12 |
| 387,73 | 13,16 | 6,92 | 20,00 | 1,16 | 15,28 | 23,23 | 1,16 | 8,00 | 23,13 |
| 397,73 | 11,76 | 9,10 | 20,00 | 1,16 | 13,64 | 23,19 | 1,16 | 10,53 | 23,15 |
| 407,73 | 10,00 | 11,00 | 20,00 | 1,16 | 11,58 | 23,16 | 1,16 | 12,75 | 23,18 |

Fig. 4

| $\gamma_p$ ; $\gamma_q$ | $\ell_p$ ; $\ell_q$ (mm) | $N_p$ ; $N_q$ | E | p x Rh (mm) | p ; q |
|---|---|---|---|---|---|
| 1 | 4,64 | 57,29 | 107,75 | 34,91 | 431 |
| 2 | 2,32 | 28,64 | 215,56 | 69,84 | 862 |
| 3 | 1,55 | 19,08 | 323,50 | 104,82 | 1294 |
| 4 | 1,16 | 14,30 | 431,65 | 139,85 | 1727 |
| 5 | 0,93 | 11,43 | 540,05 | 174,98 | 2160 |
| 6 | 0,77 | 9,51 | 648,79 | 210,21 | 2595 |

Fig. 7

| θ (°) | X (mm) | Y (mm) | Z (mm) | X1 (mm) | Z1 (mm) | Y2 (mm) | Z2 (mm) | Z*1 = Z*2 (mm) | p ou q |
|---|---|---|---|---|---|---|---|---|---|
| 47,73 | 10,00 | 11,00 | 20,00 | 11,58 | 23,16 | 12,75 | 23,18 | 26,30 | 325 |
| 57,73 | 7,94 | 12,57 | 20,00 | 9,18 | 23,14 | 14,59 | 23,21 | 26,31 | 325 |
| 67,73 | 5,63 | 13,76 | 20,00 | 6,51 | 23,12 | 15,99 | 23,25 | 26,33 | 325 |
| 77,73 | 3,16 | 14,53 | 20,00 | 3,65 | 23,11 | 16,91 | 23,28 | 26,36 | 325 |
| 87,73 | 0,59 | 14,85 | 20,00 | 0,68 | 23,10 | 17,32 | 23,32 | 26,39 | 326 |
| 97,73 | -2,00 | 14,73 | 20,00 | -2,31 | 23,11 | 17,21 | 23,36 | 26,44 | 326 |
| 107,73 | -4,53 | 14,16 | 20,00 | -5,23 | 23,12 | 16,57 | 23,40 | 26,50 | 327 |
| 117,73 | -6,92 | 13,16 | 20,00 | -8,00 | 23,13 | 15,42 | 23,44 | 26,56 | 328 |
| 127,73 | -9,10 | 11,76 | 20,00 | -10,53 | 23,15 | 13,80 | 23,48 | 26,62 | 329 |
| 137,73 | -11,00 | 10,00 | 20,00 | -12,75 | 23,18 | 11,75 | 23,51 | 26,68 | 329 |
| 147,73 | -12,57 | 7,94 | 20,00 | -14,59 | 23,21 | 9,34 | 23,53 | 26,75 | 330 |
| 157,73 | -13,76 | 5,63 | 20,00 | -15,99 | 23,25 | 6,63 | 23,55 | 26,81 | 331 |
| 167,73 | -14,53 | 3,16 | 20,00 | -16,91 | 23,28 | 3,72 | 23,56 | 26,87 | 332 |
| 177,73 | -14,85 | 0,59 | 20,00 | -17,32 | 23,32 | 0,69 | 23,57 | 26,92 | 332 |
| 187,73 | -14,73 | -2,00 | 20,00 | -17,21 | 23,36 | -2,35 | 23,56 | 26,97 | 333 |
| 197,73 | -14,16 | -4,53 | 20,00 | -16,57 | 23,40 | -5,33 | 23,56 | 27,00 | 333 |
| 207,73 | -13,16 | -6,92 | 20,00 | -15,42 | 23,44 | -8,14 | 23,54 | 27,03 | 334 |
| 217,73 | -11,76 | -9,10 | 20,00 | -13,80 | 23,48 | -10,70 | 23,52 | 27,04 | 334 |
| 227,73 | -10,00 | -11,00 | 20,00 | -11,75 | 23,51 | -12,92 | 23,49 | 27,05 | 334 |
| 237,73 | -7,94 | -12,57 | 20,00 | -9,34 | 23,53 | -14,74 | 23,46 | 27,04 | 334 |
| 247,73 | -5,63 | -13,76 | 20,00 | -6,63 | 23,55 | -16,11 | 23,42 | 27,02 | 334 |
| 257,73 | -3,16 | -14,53 | 20,00 | -3,72 | 23,56 | -16,98 | 23,38 | 26,98 | 333 |
| 267,73 | -0,59 | -14,85 | 20,00 | -0,69 | 23,57 | -17,34 | 23,34 | 26,94 | 333 |
| 277,73 | 2,00 | -14,73 | 20,00 | 2,35 | 23,56 | -17,16 | 23,30 | 26,89 | 332 |
| 287,73 | 4,53 | -14,16 | 20,00 | 5,33 | 23,56 | -16,47 | 23,26 | 26,84 | 331 |
| 297,73 | 6,92 | -13,16 | 20,00 | 8,14 | 23,54 | -15,28 | 23,23 | 26,78 | 331 |
| 307,73 | 9,10 | -11,76 | 20,00 | 10,70 | 23,52 | -13,64 | 23,19 | 26,71 | 330 |
| 317,73 | 11,00 | -10,00 | 20,00 | 12,92 | 23,49 | -11,58 | 23,16 | 26,65 | 329 |
| 327,73 | 12,57 | -7,94 | 20,00 | 14,74 | 23,46 | -9,18 | 23,14 | 26,58 | 328 |
| 337,73 | 13,76 | -5,63 | 20,00 | 16,11 | 23,42 | -6,51 | 23,12 | 26,52 | 327 |
| 347,73 | 14,53 | -3,16 | 20,00 | 16,98 | 23,38 | -3,65 | 23,11 | 26,47 | 327 |
| 357,73 | 14,85 | -0,59 | 20,00 | 17,34 | 23,34 | -0,68 | 23,10 | 26,42 | 326 |
| 367,73 | 14,73 | 2,00 | 20,00 | 17,16 | 23,30 | 2,31 | 23,11 | 26,37 | 326 |
| 377,73 | 14,16 | 4,53 | 20,00 | 16,47 | 23,26 | 5,23 | 23,12 | 26,34 | 325 |
| 387,73 | 13,16 | 6,92 | 20,00 | 15,28 | 23,23 | 8,00 | 23,13 | 26,31 | 325 |
| 397,73 | 11,76 | 9,10 | 20,00 | 13,64 | 23,19 | 10,53 | 23,15 | 26,30 | 325 |
| 407,73 | 10,00 | 11,00 | 20,00 | 11,58 | 23,16 | 12,75 | 23,18 | 26,30 | 325 |

Fig. 8

$$\frac{X_j - Y_j tg(\alpha)}{X_2 - Y_2 tg(\alpha)} = \frac{\dfrac{Y_j}{\cos(\alpha)} + D}{\dfrac{Y_2}{\cos(\alpha)} + D}$$

$$Y_2 = \frac{L}{\cos(\alpha)} - X_2 tg(\alpha)$$

$$\frac{Z}{Z_2} = \frac{\dfrac{Y_j}{\cos(\alpha)} + D}{\dfrac{Y_2}{\cos(\alpha)} + D}$$

X-RAY IMAGING METHOD AND DEVICE WITH THREE-DIMENSIONAL PROCESSING

CROSS REFERENCE TO RELATED APPLICATIONS

This application is a National Phase application of PCT/EP2010/058616 filed Jun. 18, 2010, claiming priority of FR 09/03261 filed Jul. 3, 2009, which are incorporated by reference herein in their entirety.

BACKGROUND OF THE INVENTION

1. Field of the Invention

The invention relates to a X-ray imaging method, in which a body to be examined (3) is received by a support (1) and in which, a X-ray (i, j) beam (7) is emitted from a focal point (F1,F2) of a source (5) towards the body (3), an intensity is attenuated due to the passage of the X-rays through the body and detected by a detector (9) irradiated by the beam, for different pairs of angular positions $(\theta_a, \theta_b)$ taken by the body or the source (5)—detector (9) assembly around a rotation axis ($\Omega$), said two angular positions $(\theta_a, \theta_b)$ of said different pairs having an angular difference ($\Delta$), the detected intensities are converted into data $(c^{(a)}, \rho^{(b)})$ by a digital converter (11) and, the data $(c^{(a)}, \rho^{(b)})$ are processed by a programmed computer (13) using the following formula:

$$C = \frac{\rho^{(b)}}{n} + \frac{c^{(a)}}{n} - \frac{1}{2_n^2}\left(\sum_{k=1}^{n} c_k^{(a)} + \sum_{u=1}^{n} \rho_u^{(b)}\right)$$

to calculate a value (C) of the attenuation coefficient at a point (P0) of a set of points {P0}, for a given pair of said angular positions $(\theta_a, \theta_b)$, in order to obtain an image representing an X-ray attenuation coefficient for said set of points {P0} of the body (3), where, in the formula:

$c^{(a)}$ is the data coming from the intensity detected at an impact point $T^{(a)}$ of a first ray i passing through said point P0 for said first angular position $\theta_a$, $\rho^{(b)}$ is the data coming from the intensity detected at an impact point $R^{(b)}$ of a second ray j passing through said point P0 for said second angular position $\theta_b$, $$\sum_{k=1}^{n} c_k^{(a)}$$

is the load associated with said first ray impact point $T^{(a)}$, defined by the sum of data $c_k^{(a)}$ coming from intensities detected in the first angular position $\theta_a$, along n points $T_k^{(a)}$ of a first load calculation line passing closest to said first impact point $T^{(a)}$, and $$\sum_{u=1}^{n} \rho_u^{(b)}$$

is the load associated with said second ray impact point $R^{(b)}$, defined by the sum of data $\rho_u^{(b)}$ coming from the intensities detected in the second angular position $\theta_b$, along n points $R_u^{(b)}$ of a second load calculation line passing closest to said second impact point $R^{(b)}$.

2. Description of Related Art

A process of this type is known from French patent application FR 2,888,374 and international patent application WO 2007/006560 filed by the inventor. The attenuation coefficient C at point P0 is calculated by the so-called direct generation method. The calculation only requires the $c^{(a)}$ and $\rho^{(b)}$ data coming from the intensities detected at two impact points of the two X-rays passing through said point P0 for the first and the second angular positions taken by the body or the source—detector assembly around the rotation axis $\Omega$.

The direct generation formula described in patent applications FR 2,888,374 and WO 2007/006560 derives from a simplification of the general formula of the Lagrangian:

$$C_{ij} = B_{ij} + \frac{1}{n}\left(\rho_j - \sum_{i=1}^{n} B_{ij}\right) + \frac{1}{m}\left(c_i - \sum_{j=1}^{m} B_{ij}\right) - \frac{1}{nm}\left(\sum_{j=1}^{m}\rho_j - \sum_{i=1}^{n}\sum_{j=1}^{m} B_{ij}\right)$$

wherein Bij is equated with the half sum of the detected intensity $c_i$ at said first impact point, divided by the number m of impact points of said first load line and the detected intensity $\rho_j$ at said second impact point, divided by the number n of impact points of the second load line:

$$B_{ij} = \frac{1}{2}\left(\frac{\rho_j}{n} + \frac{c_i}{m}\right)$$

and wherein, due to conservation of the total irradiation dose:

$$\sum_{i=1}^{n} c_i = \sum_{j=1}^{m} \rho_j$$

As a result:

$$C_{ij} = \frac{\rho_j}{n} + \frac{c_i}{m} - \frac{1}{2nm}\left(\sum_{i=1}^{n} c_i + \sum_{j=1}^{m} \rho_j\right)$$

The special case where n=m leads to:

$$C_{ij} = \frac{\rho_j}{n} + \frac{c_i}{n} - \frac{1}{2_n^2}\sum_{k=1}^{n}(\rho_k + c_k)$$

The direct generation method is used to calculate the attenuation coefficient of a set of points {P0} belonging to a sectional plane of the body, perpendicularly to the rotation axis $\Omega$. Under these conditions, the loads associated with the first and second impact points are calculated along two load calculation lines defined by the trace of the sectional plane on the detector, for the first and second angular positions taken by the body or the source—detector assembly around the rotation axis $\Omega$. The value of the associated loads is constant for all P0 points belonging to the sectional plane.

The basic operations for calculating the attenuation coefficient C lead to a very significant time saving. The subtractive term that accounts for loads associated with the first and second impact points is calculated once for all and its value is only called in the calculation of the attenuation coefficient C of all points P0 of the sectional plane. In addition, the calculation of the attenuation coefficient C does not require back-projection of the image obtained in the first angular position into the image obtained in the second angular position. Direct calculation from the data $c^{(a)}$ and $\rho^{(b)}$ coming from the intensities detected at two impact points leads to a significant reduction in calculation errors.

However, the calculation of the attenuation coefficient C in a sectional plane perpendicular to the rotation axis Ω requires to move the body or the source—detector assembly parallel to said axis, to obtain images of a series of sectional planes, ie to explore a volume of the body to be examined.

BRIEF SUMMARY OF THE INVENTION

One object of this invention is to overcome the limitation of the method described above according to which the attenuation coefficient is calculated in a sectional plane perpendicular to the rotation axis while maintaining the high calculation speed and reduced calculation errors brought by the direct generation method.

To this end, the invention provides a method consistent with that described above, wherein the computer is programmed to perform the following steps:

(1) pre-calculate, for any generic point of a volume irradiated by the beam emitted by the source, the positions on the detector of a first impact point $T^{(a)}$ of a ray i and a second impact point $R^{(b)}$ of a ray j, the two rays i and j passing through the generic point and corresponding to one another by a rotation of either the generic point or the source—detector assembly around the rotation axis Ω, whose angle equals the angular difference Δ between the two angular positions ($\theta_a$, $\theta_b$) of said different pairs of said angular positions of the body or the source—detector assembly around the rotation axis Ω, (2) pre-calculate the positions on the detector of first and second load calculation lines, along detection points $T_{p,k}$; k=1→n; p=1→m and $R_{q,u}$; u=1→n; q=1→m, said load calculation lines converging respectively in a first geometrical point and a second geometrical point whose positions are determined by the focal point—rotation axis distance and the detector—rotation axis distance, each load calculation line being inclined with respect to the rotation axis with a slope angle $\gamma_p$ or $\gamma_q$ which runs a series of discrete values determined by a spatial resolution of the detector parallel to the rotation axis, (3) calculate the value of the attenuation coefficient at point P0 in the volume irradiated by the beam by using the pre-calculated positions of the first and second impact points $T^{(a)}$; $R^{(b)}$ and the pre-calculated first p and second q load calculation lines $T_{p,k}^{(a)}$; k=1→n; $R_{q,u}^{(b)}$; u=1→n that pass closest to the first and second impact points ($T^{(a)}$; $R^{(b)}$) respectively, (4) repeat step (3) for said different pairs of angular positions ($\theta_a, \theta_b$) taken by the body or the source—detector assembly around the rotation axis and calculate a mean value <C> of the attenuation coefficient at point P0 for said different pairs of angular positions, and (5) repeat step (4) and display on the computer screen the image representing the mean values <C> of the set of points {P0}.

Step (1) enables a geometrical data base to be set up by which any point in the volume irradiated by the beam is associated with the two impact points of the two rays that pass through this point.

The m first and second load calculation lines defined at step (2) are the trace on the detector of m planes inclined with respect to the rotation axis. The angular difference between two planes is set according to the spatial resolution of the detector parallel to the rotation axis. It is preferably chosen as low as possible to define load calculation lines as tight as possible.

Step (3) uses the pre-calculated geometrical data base defined at step (1) and the pre-calculated m load calculation lines defined at step (2) to calculate the attenuation coefficient C at any point P0 of the body. Depending on the position of this point P0 in the volume irradiated by the beam, the computer searches the corresponding first and second impact points in the geometrical data base, calls the data $c^{(a)}$ coming from the intensity detected at the first impact point for the first angular position, calls the data $\rho^{(b)}$ coming from the intensity detected at the second impact point for the second angular position, searches the load calculation line that passes closest to the first point impact and calculates the load associated with said first impact point, searches the load calculation line that passes closest to the second impact point and calculates the load associated with said second impact point, and finally calculates the value C of the attenuation coefficient at point P0 for the pair of said angular positions.

At step (4), the method switches form one pair of angular positions to another to calculate a mean value of the attenuation coefficient at the point P0. At step (5), the method switches from one point of the body to be examined to another.

Thus, the claimed method enables to track any point of the body located in the irradiation volume of the beam emitted by the source. Thanks to the programming of the computer, the calculation of the attenuation coefficient is no more limited to points belonging to a single sectional plane perpendicular to the rotation axis. The pre-calculated load calculation lines and the pre-calculated geometrical data base do not impair the high calculation speed and the reduced calculation errors brought by the direct generation method. The computing time is strictly limited to points P0 whose values of the attenuation coefficient are desired, with no need to extract them from a broader set of calculated points. In addition, the volume to be irradiated is limited to what is strictly necessary to obtain calculation relevant information.

Compared with the plane tomography methods described in the applications mentioned in the introduction, the present invention provides for a volume tomography method.

Other advantages of the invention will become clear from the description of the embodiments illustrated by the drawings.

BRIEF DESCRIPTION OF THE SEVERAL VIEWS OF THE DRAWINGS

FIG. 4 is a table showing the coordinates of two impact points in a series of angular positions.

FIG. 7 is a table indicating stair widths, detection points per stair, stairs per load calculation line and a height reached by two load calculation lines.

FIG. 8 is a table indicating coordinates of two impact points, altitude Z* of two corresponding reference points and index p or q of two load calculation lines passing closest to said two reference points.

DETAILED DESCRIPTION OF THE INVENTION

The method according to the invention is first described with reference to an X-ray imaging device comprising two source—detector assemblies. However, the invention is not limited to such geometry and the description of an X-ray imaging device comprising a single source—detector assembly will be given below.

Figure 1:
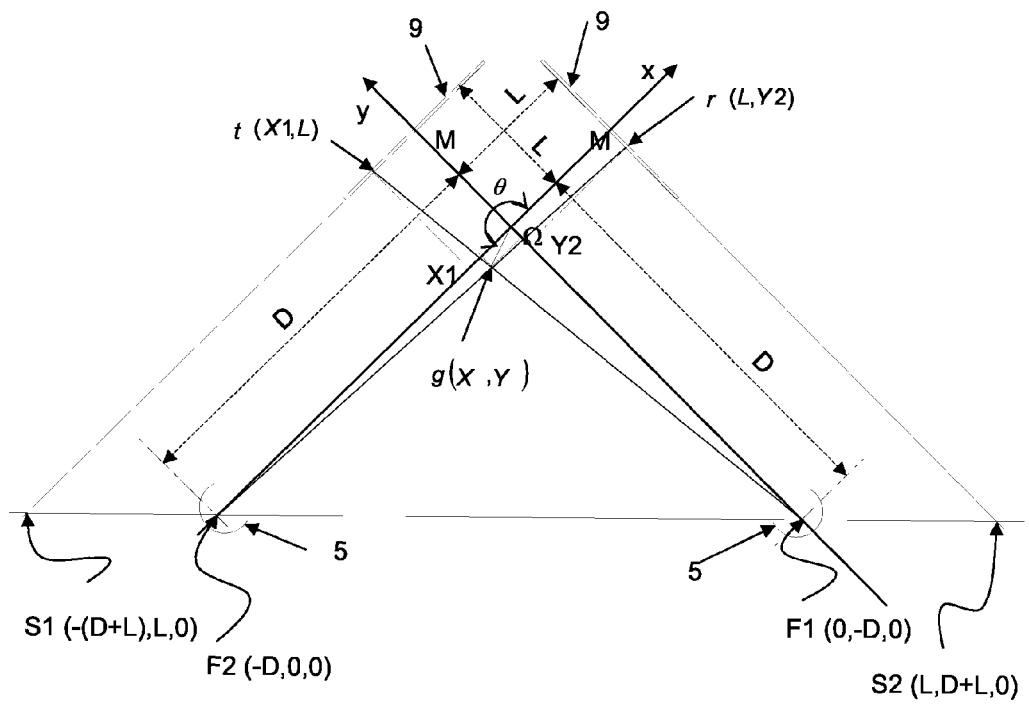
FIG. 1 is a view in the (O, x, y) plane of the geometry of an imaging device designed for the implementation of a method according to the invention, the device comprising two source—detector assemblies.

FIG. 1, an X-ray imaging device, comprises two sources 5 emitting a beam of X-rays from two focal points F1 and F2. The two points F1 and F2 are respectively arranged on two axes x and y, at the same distance D from centre O. The coordinate system (O, x, y) defines the reference plane of the device. The axis perpendicular to the reference plane and passing through the centre O defines the rotation axis $\Omega$.

The device also comprises two detectors 9, arranged perpendicularly to x and y axes. x axis passes through focal point F1. y axis passes through focal point F2. The two detectors 9 are arranged at the same distance L from the centre O. They extend over a 2l width and a 2 h height. When irradiated by the beams emitted by the sources, they detect an intensity attenuated according to the passage of X-rays through a body to be examined that is placed between sources and detectors.

FIG. 1 is deliberately limited to the device geometry, ie neither the body to be examined nor its support are represented. However, said support rotates around the rotation axis $\Omega$ to explore the body to be examined for different angular positions. Alternatively, the two source—detector assemblies rotate around the rotation axis a FIG. 1 illustrates a geometry for which said support or source—detector assembly rotation leads to pairs of angular positions wherein the two angular positions of each pair have an angular difference $\Delta$ equal to 90°.

Not shown in FIG. 1, the device further comprises an analogous to digital converter to convert the detected intensities into data and a computer programmed to process the data in order to obtain an image representing a X-ray attenuation coefficient of a set of points {P0} of the body to be examined.

It should be recalled here that, for a pair of angular positions $\theta_a$, $\theta_b$, the attenuation coefficient at a point P0 of the body is calculated by using the following formula:

$$C = \frac{\rho^{(b)}}{n} + \frac{c^{(a)}}{n} - \frac{1}{2n^2}\left(\sum_{k=1}^{n} c_k^{(a)} + \sum_{u=1}^{n} \rho_u^{(b)}\right)$$

where:

$c^{(a)}$ is the data coming from the intensity detected at impact point $T^{(a)}$ of first ray i passing through said point P0 for said first angular position $\theta_a$, $\rho^{(b)}$ is the data coming from the intensity detected at impact point $R^{(b)}$ of second ray j passing through said point P0 for said second angular position $\theta_b$, $$\sum_{k=1}^{n} c_k^{(a)}$$

is the load associated with said first ray impact point $T^{(a)}$, defined by the sum of data $c_k^{(a)}$ coming from intensities detected in the first angular position $\theta_a$, along n points $T_k^{(a)}$ of a first load calculation line passing closest to said first impact point $T^{(a)}$, and $$\sum_{u=1}^{n} \rho_u^{(b)}$$

is the load associated with said second ray impact point $R^{(b)}$ defined by the sum of data $\rho_u^{(b)}$ coming from the intensities detected in the second angular position $\theta_b$, along n points $R_u^{(b)}$ of a second load calculation line passing closest to said second impact point $R^{(b)}$.

According to the invention, the computer is programmed to pre-calculate in a first step, positions on the detectors 9 of impact point T of ray i and impact point R of ray j, said rays i and j passing through a generic point G of a volume irradiated by the beams emitted by the sources 5.

Figure 2:
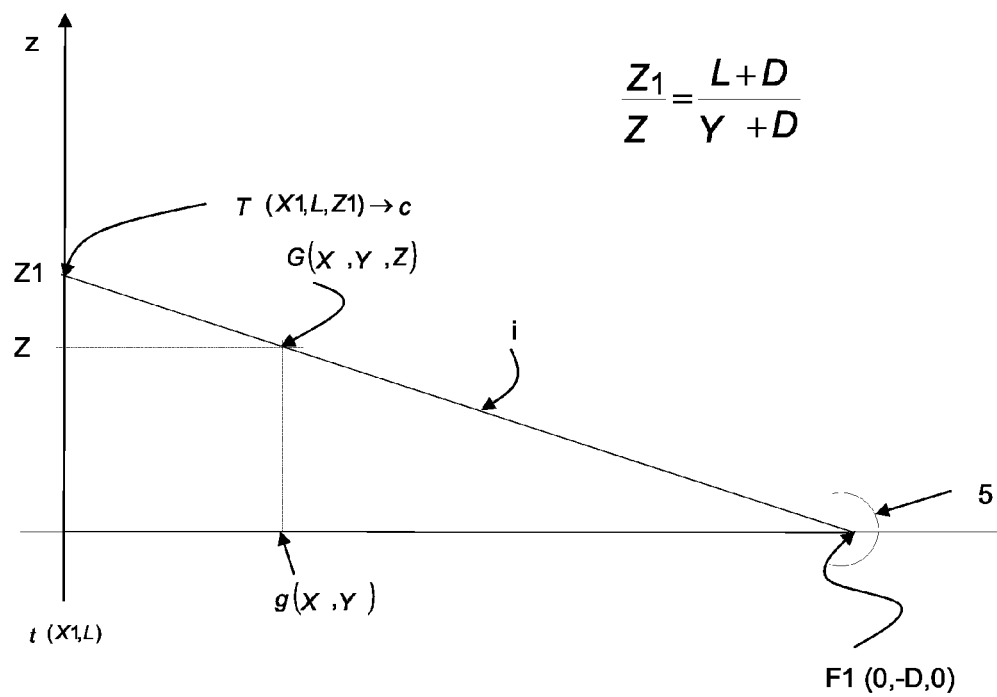
FIG. 2 is an elevation view parallel to the rotation axis Ω, showing a first ray i and its impact point on one of the detectors of the device shown in FIG. 1.

FIG. 2, the ray i emitted by focal point F1 passes through generic point G (X, Y, Z) and hits one of the detectors 9 at impact point T (X1, L, Z1). At said impact point, the data coming from the intensity detected by the detector is c. Altitude Z1 is calculated by the following formula:

$$\frac{Z_1}{Z} = \frac{L+D}{Y+D} = k_1$$

Figure 3:
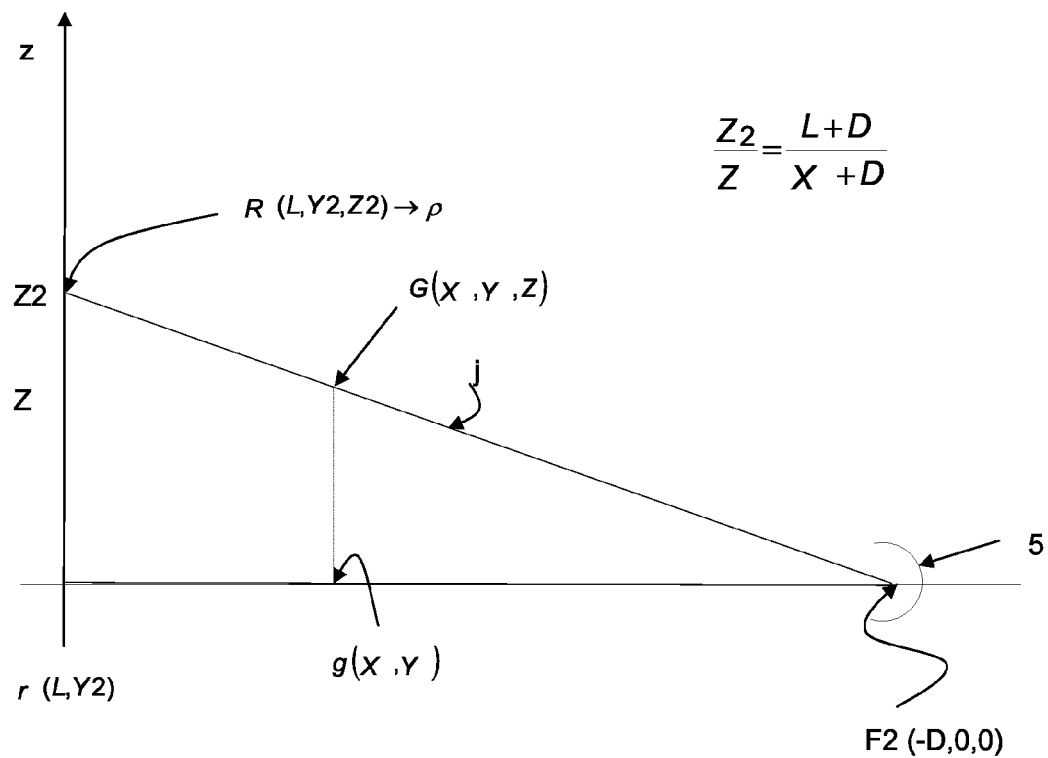
FIG. 3 is an elevation view parallel to the rotation axis Ω, showing a second ray j and its impact point on the other detector of the device shown in FIG. 1.

Similarly, FIG. 3, the ray j emitted by focal point F2 passes through generic point G (X, Y, Z) and hits the other detector 9 at impact point R (L, Y2, Z2). At said impact point, the data coming from the intensity detected by the detector is $\rho$. Altitude Z2 is calculated by the following formula:

$$\frac{Z_2}{Z} = \frac{L+D}{X+D} = k_2$$

Rays i and j passing through generic point G correspond to one another by a rotation of one of the source 5—detector 9 assemblies to the other source 5—detector 9 assembly around the axis rotation Q. The rotation angle equals 90 degrees, ie equals the angular difference $\Delta$ between the two angular positions $\theta_a$, $\theta_b$ of said different pairs of angular positions taken by the body 3 or the two source 5—detector 9 assemblies around the rotation axis $\Omega$.

FIG. 1, generic point G (X, Y, Z) and impact point T (X1, L, Z1) of ray i on one of the detectors project onto the median reference plane in points g (X, Y, 0) and t (X1, L, 0). Ray i emitted by focal point F1 and passing through generic point G projects onto the median plane and passes through the projected points g (X, Y, 0) and t (X1, L, 0). Coordinate X1 is calculated by the following formula, similar to Z1 calculation:

$$\frac{X_1}{X} = \frac{L+D}{Y+D} = k_1$$

Similarly, impact point R (L, Y2, Z2) of ray j on the other detector projects onto the median plane at point r (L, Y2, 0). Ray j emitted by focal point F2 and passing through the generic point G projects onto the median plane and passes through the projected points g (X, Y, 0) and r (L, Y2, 0). Coordinate Y2 is calculated by the following formula, similar to Z2 calculation:

$$\frac{Y_2}{Y} = \frac{L+D}{X+D} = k_2$$

The computer programme first step enables a geometrical data base to be set up which provides for a geometrical correspondence between any point P0 in the volume irradiated by the beams emitted by the two sources 5 and two impact points on the two detectors 9 of two rays i and j that come from the two source focal points F1 and F2 and pass through said point P0. This database is determined by the device geometry, in this case by the focal point F1 or F2—rotation axis $\Omega$ distance D and the detector 9—rotation axis $\Omega$ distance L. Said database neither depends on the body to be examined nor on the different pairs of angular positions taken by the body or the source—detector assemblies around the rotation axis $\Omega$, at constant angular difference $\Delta$. It is programmed once for all and reused for all points of the body exploration volume under all pairs of angular positions.

As a numerical example, in FIGS. 1 to 3, D=150 cm and L=25 cm. The table in FIG. 4 shows the relationship between the generic point coordinates G (X, Y, Z) and the two impact points coordinates T (X1, L, Z1) and R (L, Y2, Z2) in a series of angular positions $\theta$ taken by generic point G around the rotation axis $\Omega$ and ranging from 10 degrees to 10 degrees.

The computer programme includes a second step to pre-calculate the position on one of the detectors 9 of m first load calculation lines each defined by n detection points $T_{p,k}$; k=1→n; p=1→m and to pre-calculate on the other detector 9, m second load calculation lines each defined by n detection points $R_{q,u}$; U=1→n; q=1→M. The number n of detection points along a load calculation line is determined by the spatial resolution of the detectors 9 in the width direction. The number m of load calculation lines is determined by the resolution of the detectors in the vertical direction, ie parallel to the rotation axis $\Omega$.

The first and second load calculation lines converge respectively in a first S1 and second S2 geometric points whose positions are determined by the focal points F1 and F2—rotation axis $\Omega$ distance D and the detectors 9—rotation axis $\Omega$ distance L. Each load calculation line p or q is inclined from the rotation axis $\Omega$ by a slope angle $\gamma_p$ or $\gamma_p$ which runs a series of discrete values determined by the spatial resolution of the detectors 9 in the height direction.

Figure 5:
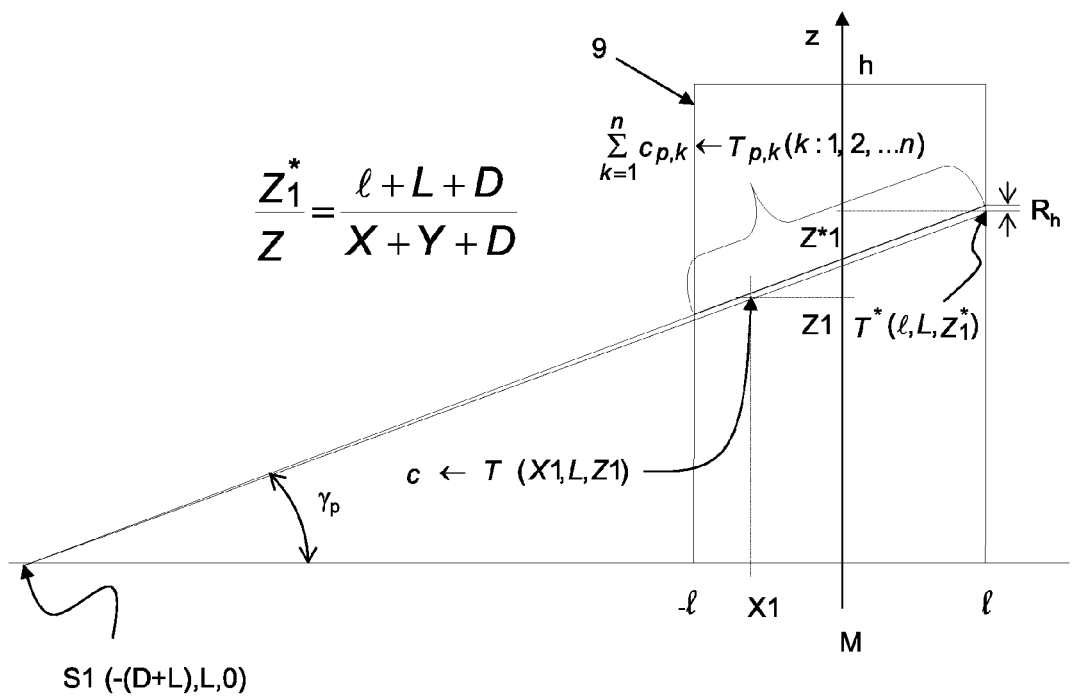
FIG. 5 is a front view of one of the detectors, showing the impact point of the first ray i and a load calculation line passing closest to said impact point.

FIG. 5 shows a front side of one of the detectors, limited to a mid-height. This detector is perpendicular to the y axis which passes through focal point F1 of one of the two sources. Conventionally, the left side, respectively the right side, of the detector is defined by the side that extends to the left, respectively to the right, with respect to the projection of the rotation axis $\Omega$ onto the detector by the beam emitted by focal point F1. FIG. 5 also shows impact point T (X1, L, Z1) of ray i passing through generic point G (X, Y, Z) and the load calculation line that passes closest to said impact point. This line p is defined by the detection points $T_{p,k}$; k=1→n and the load calculated along this line equals $$\sum_{k=1}^{n} c_{p,k}.$$

The load calculation line p extends to the left beyond the detector and converges to geometric point S1 with coordinates (−(D+L), L, 0). As shown in FIG. 1, this geometric point belongs to the (O, x, y) reference plane and forms the intersection of the line connecting the two focal points F1 and F2 with the detector plane, perpendicular to the y axis.

The slope of load calculation line p is set according to the spatial resolution of the detector in the vertical direction. In the example shown in FIG. 5, the right edge of the detector, that is to say the edge opposite to convergence geometric point S1, preferably is selected to determine the slope angle $\gamma_p$ increment of said m first load calculation lines. This choice leads to slope angles as low as possible and provides for the tightest set of m load calculation lines. If the left edge of the detector, that is to say the edge on the same side as the convergence geometric point S1, is chosen to increment the slope angles, said slope angles are greater and the m load calculation line set is less tight.

Figure 6:
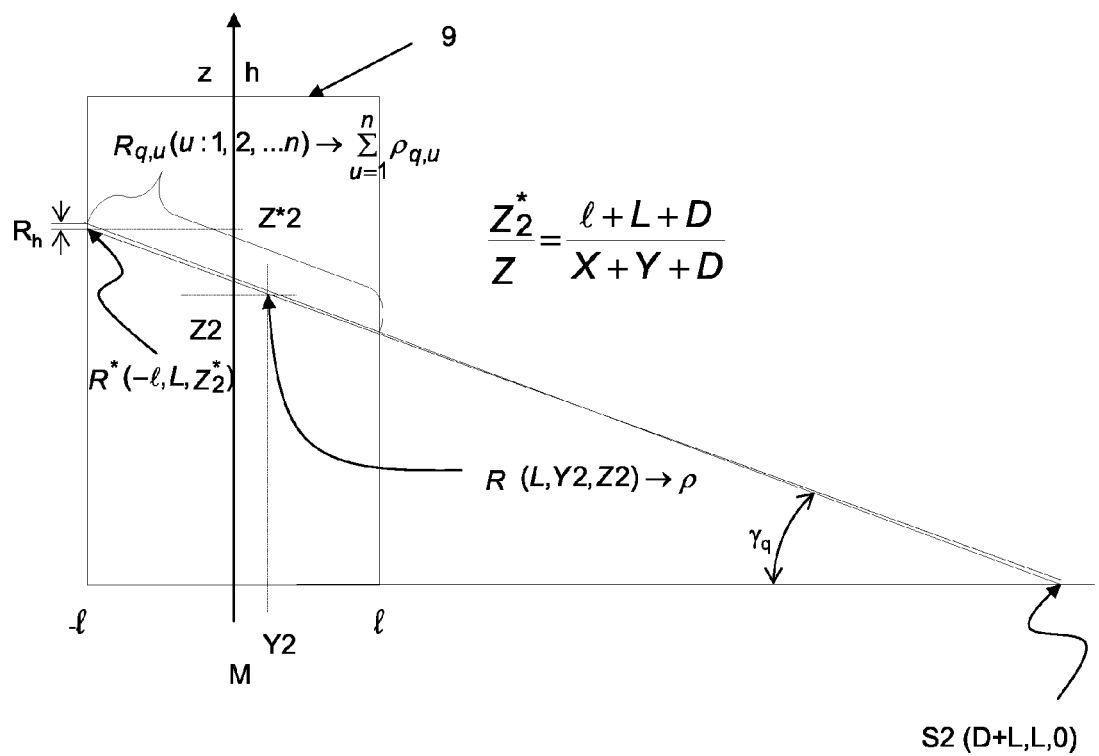
FIG. 6 is a front view of the other detector, showing the impact point of the second ray j and a load calculation line passing closest to said impact point.

Similarly, FIG. 6 shows a front side of the other detector 9, limited to a mid-height. This detector is perpendicular to the x axis which passes through focal point F2 of the other source. Conventionally, the left side, respectively the right side, of the detector is defined by the side that extends to the left, respectively to the right, with respect to the projection of the rotation axis $\Omega$ projected onto the detector by the beam emitted by focal point F2. In FIG. 6 also shows impact point R (L, Y2, Z2) of ray j passing through generic point G (X, Y, Z) and the load calculation line that passes closest to said impact point. This line q is defined by the detection points $R_{q,u}$; u=1→n and the load calculated along this line equals $$\sum_{u=1}^{n} \rho_{q,u}.$$

The load calculation line q extends to the right beyond the detector and converges to geometric point S2 with coordinates (L, (D+L), 0). As shown in FIG. 1, this geometric point belongs to the (O, x, y) reference plane and forms the intersection of the line connecting the two focal points F1 and F2 with the detector plane, perpendicular to the x axis.

The slope of load calculation line q is set according to the spatial resolution of the detector in the vertical direction. In the example shown in FIG. 6, the left edge of the detector, that is to say the edge opposite to convergence geometric point S2, is preferably selected to determine the slope angle $\gamma_q$ increment of said m second load calculation lines. This choice leads to slope angles as low as possible and provides for the tightest set of load calculation lines. If the right edge of the detector, that is to say the edge on the same side as the convergence geometric point S2, is chosen to increment the slope angles, said slope angles are greater and the load calculation line set is less tight.

If $R_h$ is the detector spatial resolution in the height direction and assuming the right edge of one of the detectors was chosen to increment the slope angles, slope angle $\gamma_p$ of line p of said m first load calculation lines is given by the formula:

$$\gamma_p = \text{Arc}tg\left(\frac{p \times R_h}{D+L+\ell}\right); p = 1 \to m = \frac{h}{R_h}$$

Similarly, assuming that the left edge of the other detector was chosen to increment the slope angles, slope angle $\gamma_q$ of line q of the m second load calculation lines is given by the formula:

$$\gamma_q = -\text{Arc}tg\left(\frac{q \times R_h}{D+L+\ell}\right); q = 1 \to m = \frac{h}{R_h}$$

In order to pre-calculate the first and second load calculation lines, each line is approximated by a series of stairs. The stairs height is equated with the value of the spatial resolution $R_h$ in the height direction. The stairs width is given by the formula:

$$\ell_p = \frac{D+L+\ell}{p} \text{ or } \ell_q = \frac{D+L+\ell}{q}$$

Taking into account the spatial resolution $R_l$ of the detectors in the width direction, the number of detection points, or pixels, per stair equals:

$$N_p = \frac{\ell_p}{R_\ell} \text{ or } N_q = \frac{\ell_q}{R_\ell}$$

Stairs width and number of detection points per stair decrease as the slope angle of the load calculation lines increases.

The first and second m load calculation lines defined above draw on the two detectors the trace of m planes inclined with respect to the rotation axis Ω. All these plans correspond one another by a rotation around the line connecting the two focal points F1 and F2. The angular difference between two inclined planes is set according to the spatial resolution $R_h$ of the detectors in the height direction. An inclined plane coincides with the plane formed by the two rays i and j that pass through the generic point G (X, Y, Z) if the two impact points T (X1, L, Z1) and R (L, Y2, Z2) of said rays i and j belong to the two load calculation lines p and q that draw the trace of said inclined plane on the two detectors.

In other words, for a given spatial resolution of the detector in the vertical direction, the load calculation lines draw on the two detectors the trace of planes formed by any pair of rays i and j respectively emitted by focal points F1 and F2 and intersecting at any generic point G of the irradiated volume. For such a pair of rays i and j, load calculation line p that passes through impact point T (X1, L, Z1) of ray i and load calculation line q that passes through impact point R (L, Y2, Z2) of ray j belong to the same inclined plane, have the same index p or q and the same slope angle in absolute value, as shown in FIGS. 4 and 5:

$$p = q; \gamma_p = \gamma_q = \text{Arc}tg\left(\frac{p \times R_h}{D+L+\ell}\right); p = 1 \to m = \frac{h}{R_h}$$

As a numerical example, the geometry illustrated in FIGS. 1 to 5 was drawn with D=150 cm, L=l=h=25 cm, $R_h$=$R_l$=81 μm. The table in FIG. 7 shows, for different slope angles $\gamma_p$ or $\gamma_q$, the stairs widths $l_p$ or $l_q$, the numbers $N_p$ or $N_q$ of detection points per stair and the number E of stairs. The table also shows the height reached by the two load calculation lines, respectively on the right edge of one of the detectors and on the left edge of the other detector, and the index p or q of these two lines, obtained by rounding to the nearest integer value of the height reached relative to the spatial resolution $R_h$ of the detector in the vertical direction. The index p or q is thus equal to the height expressed in detection points or pixels number, reached by the two load calculation lines respectively on the right edge of one of the detectors and the left edge of the other detector.

The geometrical data base pre-calculated in step (1) and the first and second m load calculation lines pre-calculated in step (2) are used in step (3) of the programme to calculate the attenuation coefficient C at any point P0 of the body to be examined.

Now the body under examination is for example the kidney of an individual and point P0 of kidney occupies in FIG. 1 the position of the generic point G in the volume irradiated by the beams. The body has angular position $\theta_a$ with respect to focal point F1—detector assembly and angular position $\theta_b$ with respect to focal point F2—detector assembly. In the geometrical correspondence database, the computer searches for first $T^{(a)}$ and second $R^{(b)}$ impact points associated with said point G, calls data $c^{(a)}$ coming from the intensity detected at the first impact point $T^{(a)}$ in the first angular position $\theta_a$, calls data $\rho^{(b)}$ coming from the intensity detected at the second impact point $R^{(b)}$ in the second angular position $\theta_b$, searches for the load calculation line p $T_{p,k}^{(a)}$; k=1→n that passes closest to first impact point $T^{(a)}$ and calculates the load $$\sum_{k=1}^{n} c_{p,k}^{(a)}$$

associated with said impact point, searches for the load calculation line q $R_{q,u}^{(b)}$; u=1→n that passes closest to second point impact $R^{(b)}$ and calculates the load $$\sum_{u=1}^{n} \rho_{q,u}^{(b)}$$

associated with said impact point and finally calculates the value of the attenuation coefficient C at point P0 for the pair of angular positions $\theta_a$ and $\theta_b$.

Preferably, the computer 13 is programmed to perform step (3) with two additional steps.

On the one hand, the position on one of the detectors 9 of a first reference point T* is pre-calculated. This reference point T* (l, L, $Z^*_1$) is, FIG. 5, at the intersection of the right edge of the detector, taken to increment the discrete values of slope angles $\gamma_p$ of the m first calculation load lines $T_{p,k}$; k=1→n; p=1→m with the line passing through first geometric convergence point S1 (–(D+L) L, 0) and first impact point T (X1, L, Z1). Said first impact point T is associated with the load calculated along the load calculation line p that passes closest to the reference point T given the spatial resolution $R_h$ of the detector in the height direction.

On the other hand, the position on the other detector 9 of a second reference point R* also is pre-calculated. This reference point R* (–l, L, $Z^*_2$) is, FIG. 6, at the intersection of left edge of the other detector 9, taken to increment the discrete values of slope angles $\gamma_q$ of the m second load calculation lines $R_{q,u}$; u=1→n; q=1→m with the line passing through the second geometrical convergence point S2 (D+L, L, 0) and the second impact point R (L, Y2, Z2). The second impact point R is associated with the load calculated along the load calculation line q that passes closest to the reference point R given the spatial resolution $R_h$ of the detector in the height direction.

Since the two impact points T (X1, L, Z1) and R (L, Y2, Z2) belong to the same inclined plane, the p and q indices of the two load calculation lines are equal as well as the altitude $Z^*_1$ of the first reference point T* and the altitude $Z^*_2$ of the second reference point R*. This altitude is given by the formula:

$$\frac{Z^*_1}{Z} = \frac{Z^*_2}{Z} = \frac{\ell + L + D}{X + Y + D}$$

To continue with the numerical example above, the table in FIG. 8 shows the relationship between the coordinates of the generic point G (X,Y,Z), impact point T (X1,L,Z1) and impact point R (L,Y2,Z2), altitude Z* of the corresponding reference points T* and R* and the index p or q of the two load calculation lines passing closest to said reference points, for a series of angular positions θ taken by generic point G ranging from 10 degrees to 10 degrees around the rotation axis Ω. The index p or q is obtained by rounding to the closest integer value altitude Z* divided by the spatial resolution $R_h$ of the detector in the vertical direction.

It should be noted that impact points and load calculation lines associated with these points and involved in the calculation of the attenuation coefficient C all belong to the plane formed by rays i and j intersecting at point P0, given the spatial resolution of the detectors in the height direction. As this plane takes any inclination with respect to the rotation axis Ω, depending on any point P0 of the irradiation volume, the method according to the invention overcomes the limitation according to which the attenuation coefficient is calculated in a sectional plane perpendicular to the rotation axis and thus provides for a volume tomography method.

In step (4), the calculation of the attenuation coefficient C at point P0 for the pair of angular positions $\theta_a$ and $\theta_b$ is repeated for different pairs of angular positions obtained by the simultaneous rotation of the two source—detector assemblies around the rotation axis Ω. Alternatively, the different pairs of angular positions are obtained by two fixed source—detector assemblies while the body and its support can rotate around the rotation axis Ω. Finally in step (5), the calculation of the average value of the attenuation coefficient is repeated for any point of the body inside the irradiation volume. The method according to the invention enables any point P0 of the body inside the irradiation volume to be tracked in order to obtain an average value of the attenuation coefficient at that point.

Preferably, the computer 13 is programmed to perform step (5) with the following additional steps:

First, the terms of a first and a second load vector are pre-calculated for the two angular positions $\theta_a$ and $\theta_b$ of each pair of different angular positions obtained by rotating the two source—detector assemblies. For each pair, the m first terms of the first and second load vectors are given by the loads $$\sum_{k=1}^{n} c_{p,k}^{(a)} \text{ and } \sum_{u=1}^{n} \rho_{q,u}^{(b)}$$

along the m first and second load calculation lines.

Second, when calculating the attenuation coefficient of any point P0, the terms of the two load pre-calculated vectors for each of the different pairs of angular positions, along the two load calculation lines that pass closest the two impact points $T^{(a)}$ et $R^{(b)}$ associated with said point P0, simply are called and not recalculated from one point P0 to another point P0.

These additional steps make step (5) easier in two ways. First, loads of all points P0 associated with impact points $T^{(a)}$ and $R^{(b)}$ that belong to a same inclined plane are calculated once for all, since such impact points have a same first load vector term and a same second load vector term. Second, the pre-calculated load vector terms are called or recalled when considering any other set of points, for example when examining a different parts of the body; or when considering a same set of points but at a latter point in time.

It is worth noting that both detectors 9 are hit by rays i and j whose length varies depending on the position of the impact points with respect to the position of focal points F1 and F2. A correction is made to data coming from the detected intensities that consists in multiplying the value at an impact point by the ratio between the focal point F1 or F2—impact point square distance and the focal point F1 or F2—midpoint M square distance. The correction thus increases the data at said impact point. The ray lengthening also is taken into account since it artificially increases the dose. Either a square root of the data above, or simply a data equal to 1+e/2 instead of 1+e is used as correction coefficient.

Figure 9:
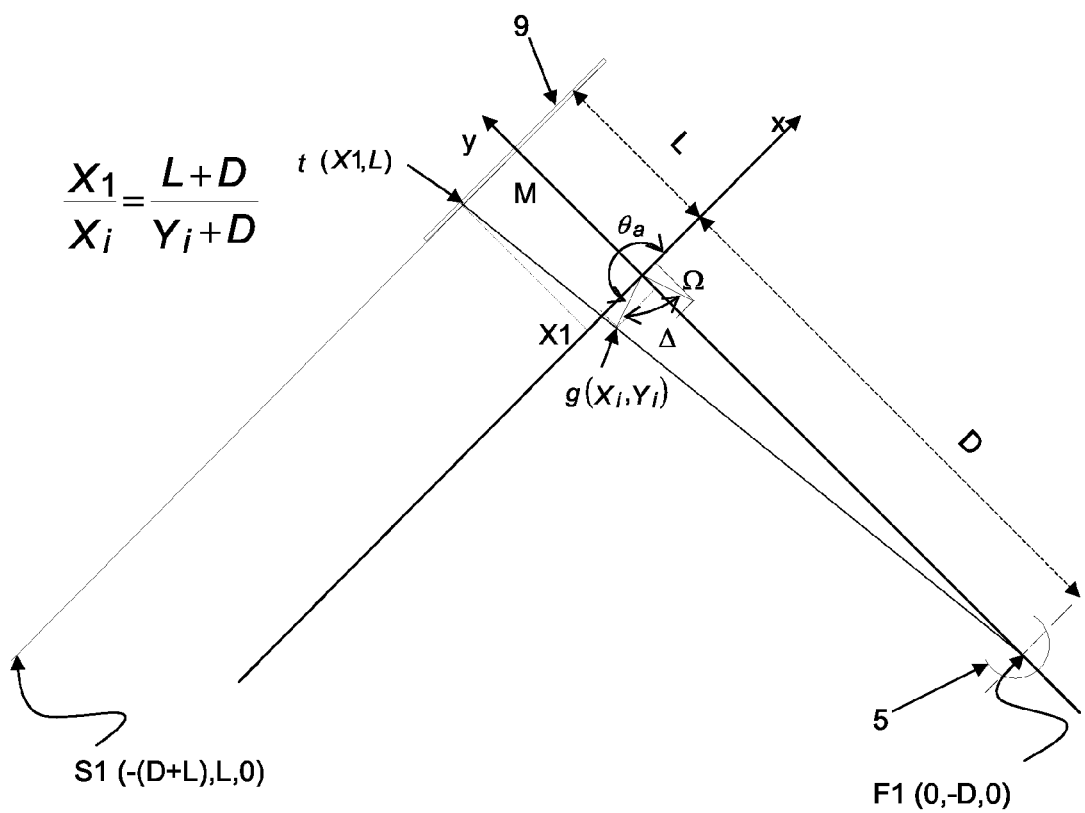
FIG. 9 is a view in the (O, x, y) plane of the geometry of an imaging device designed for the implementation of a method according to the invention, the device comprising a single source—detector assembly.

The description of the invention is continued with reference to an X-ray imaging device comprising a single source—detector assembly. FIG. 9, focal point F1 of source 5 is arranged on the y axis, at distance D from the centre O. Detector 9 is arranged perpendicular to the y axis at distance L from the centre O. The detector is 2 l wide and a 2 h high.

Although not shown in FIG. 9, the support for receiving the body to be examined rotates about the rotation axis Ω to explore the body under different angular positions θ. Alternatively, the source—detector assembly can rotate about the rotation axis Ω.

Ray i emitted by focal point F1 and passing through generic point G with coordinates $(X_i, Y_i, Z)$ hits detector 9 at impact point T with coordinates (X1, L, Z1). At said impact point, the data coming from the intensity detected by the detector is c. Altitude Z1 is calculated by the following formula:

$$\frac{Z_1}{Z} = \frac{L+D}{Y_i+D} = k_1$$

Similarly, ray j emitted by focal point F1 and passing through generic point G with coordinates ($X_j$, $Y_j$, Z) hits detector 9 at impact point R with coordinates (X2, L, Z2), after generic point G is rotated a rotation angle Δ around rotation axis Ω. At said impact point, the data coming from the intensity detected by the detector is ρ. Altitude Z2 is calculated by the following formula:

$$\frac{Z_2}{Z} = \frac{L+D}{Y_j+D} = k_2$$

Rays i and j passing through generic point G correspond to one another by a rotation of generic point G about the rotation axis Ω. The rotation angle equals to 90 degrees, ie equals the angular difference Δ between the two angular positions $\theta_a$ and $\theta_b$ of different pairs of angular positions of the body 3 about the rotation axis a FIG. 9, generic point G ($X_i$, $Y_i$, Z) and impact point T (X1, L, Z1) of ray i on the detector project onto the reference plane in points g ($X_i$, $Y_i$, 0) and t (X1, L, 0). Ray i emitted by focal point F1 and passing through generic point G projects onto the median plane and passes through the projected points g ($X_i$, $Y_i$, 0) and t (X1, L, 0). Coordinate X1 of impact point T is calculated by the formula, similar to Z1 calculation:

$$\frac{X_1}{X_i} = \frac{L+D}{Y_i+D} = k_1$$

Figure 10:
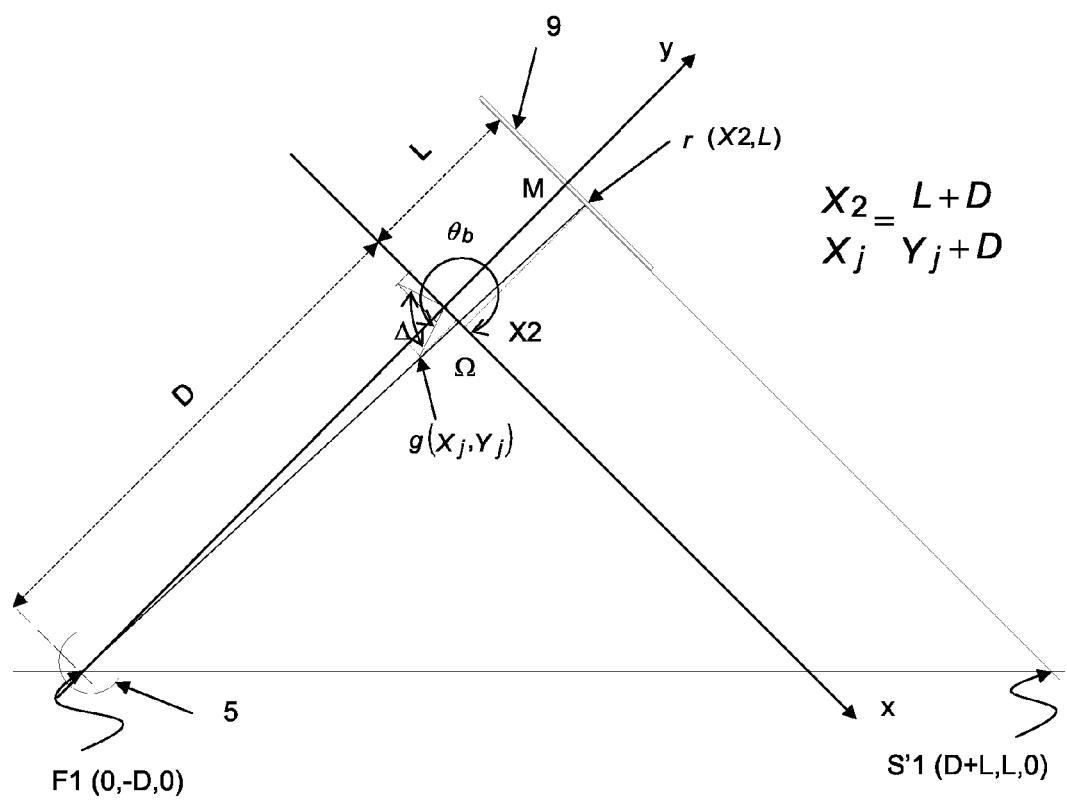
FIG. 10 is a view in the (O, x, y) plane of the geometry of the device shown in FIG. 9, wherein a generic point G is rotated by a rotation A around the rotation axis $\Omega$.

Similarly, FIG. 10, generic point G ($X_j$, $Y_j$, Z) and impact point R (X2, L, Z2) of ray j project onto the detector in the median plane in points g ($X_j$, $Y_j$, 0) and r (X2, L, 0). Ray j emitted by focal point F2 and passing through generic point G projects onto the reference plane and passes through the projected points g (X, Y, 0) and r (X2, L, 0). Coordinate Y2 of impact point R is calculated using the following formula, similar to Z2 calculation:

$$\frac{X_2}{X_j} = \frac{L+D}{Y_j+D} = k_2$$

Figure 11:
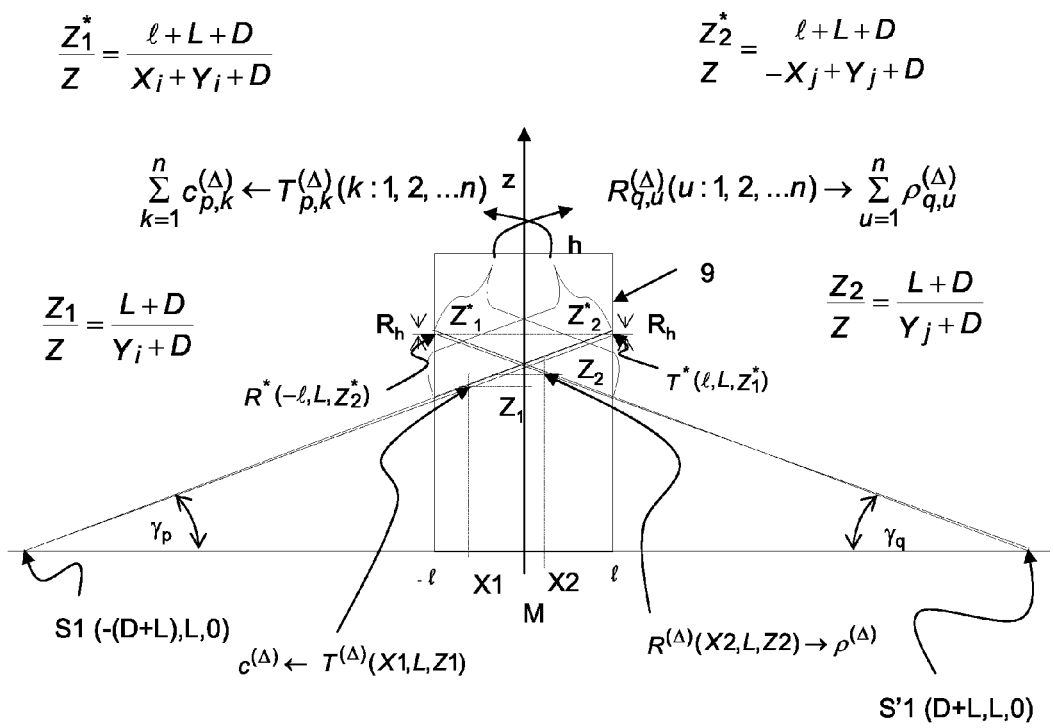
FIG. 11 is a front view of the detector, showing the impact points of the first and the second rays i and j as well as the two load calculation lines passing closest to said impact points.

FIG. 11, detector 9 is shown front side and limited to a mid-height. Conventionally, the left side, respectively the right side, of the detector is defined by the side that extends to the left, respectively to the right, with respect to the projection of the rotation axis Ω onto the detector by the beam emitted by focal point F1.

Ray i passes through point generic G ($X_i$, $Y_i$, Z) and hits the detector at impact point T (X1, L, Z1). Load calculation line p that passes closest to said impact point is defined by detection points $T_{p,k}^{(\Delta)}$; k=1→n. Said load calculation line extends to the left beyond the detector and converges to geometric point S1 with coordinates (−(D+L), L, 0). Preferably, the position on detector 9 of a first reference point T is pre-calculated. Said reference point T (l, L, $Z^*_1$) is, FIG. 11, at the intersection of the right edge of the detector, taken to increment the discrete values of slope angles $\gamma_p$ of the m first load calculation lines $T_{p,k}^{(\Delta)}$; k=1→n; p=1→m with the line passing through first geometric convergence point S1 (−(D+L), L, 0) and first impact point T (X1, L, Z1). Said first impact point T is associated with load $$\sum_{k=1}^{n} c_{p,k}^{(\Delta)}$$

calculated along the load calculation line p that passes closest to the reference point T* given the spatial resolution $R_h$ of the detector in the height direction.

Similarly, ray j passes through generic point G ($X_j$, $Y_j$, Z) and hits the detector at impact point R (X2, L, Z2). Load calculation line q that passes closest to said impact point is defined by detection points $R_{q,u}^{(\Delta)}$; u=1→n. Said load calculation line extends to the right beyond the detector and converges to geometric point with coordinates S'1 (D+L, L, 0). Preferably, the position on detector 9 of a second reference point R* is pre-calculated. Said reference point R* (−l, L, $Z^*_2$) is, FIG. 11, at the intersection of the left edge of the detector, taken to increment the discrete values of slope angles $\gamma_q$ of the m second load calculation lines $R_{q,u}^{(\Delta)}$; u=1→n; q=1→m with the line passing through second geometrical convergence point S'1 (D+L, L, 0) and second impact point R (X2, L, Z2). Said second impact point R is associated with load $$\sum_{u=1}^{n} \rho_{q,u}^{(\Delta)}$$

calculated along load calculation line q that passes closest to the reference point R* given the spatial resolution $R_h$ of the detector in the height direction.

For a given spatial resolution of the detector in the vertical direction, the m first and second load calculation lines draw on the detector the trace of m planes formed by any pair of rays i and j emitted by focal point F1, passing through generic point G and corresponding to one another by the angle Δ rotation of generic point G around the rotation axis Ω. For such a pair of rays i and j, load calculation line p that passes through impact point T (X1, L, Z1) of ray i and load calculation line q that passes through point impact R (X2, L, Z2) of ray j belong to the same inclined plane, have the same index p or q and the same slope angle in absolute value, as shown in FIG. 11. Similarly, the two reference points T(l, L, $Z^*_1$) and R (−l, L, $Z^*_2$) have the same altitude $Z^*_1$ or $Z^*_2$.

It should be noted that in the embodiments described above, the angular difference Δ between the two angular positions ($\theta_a, \theta_b$) of the different pairs of angular positions taken by the body to be examined or the source—detector assembly around the rotation axis Ω equals 90°. However, the invention includes an angular difference Δ different from 90°. Pairs of non-perpendicular angular positions enable the number of shots and the irradiation dose to be reduced. It is known that 20 shots spaced at 18° lead to 20 pairs of perpendicular angular positions. If each pair of perpendicular angular positions, eg 0°-90° is associated with a pair acute, such as 0°-72° and a pair obtuse, for example 0°-108°, the number of pairs is three times higher than the shots number. This means a higher number of estimations of the attenuation coefficient at a given point, at a given shot number.

Figure 12:
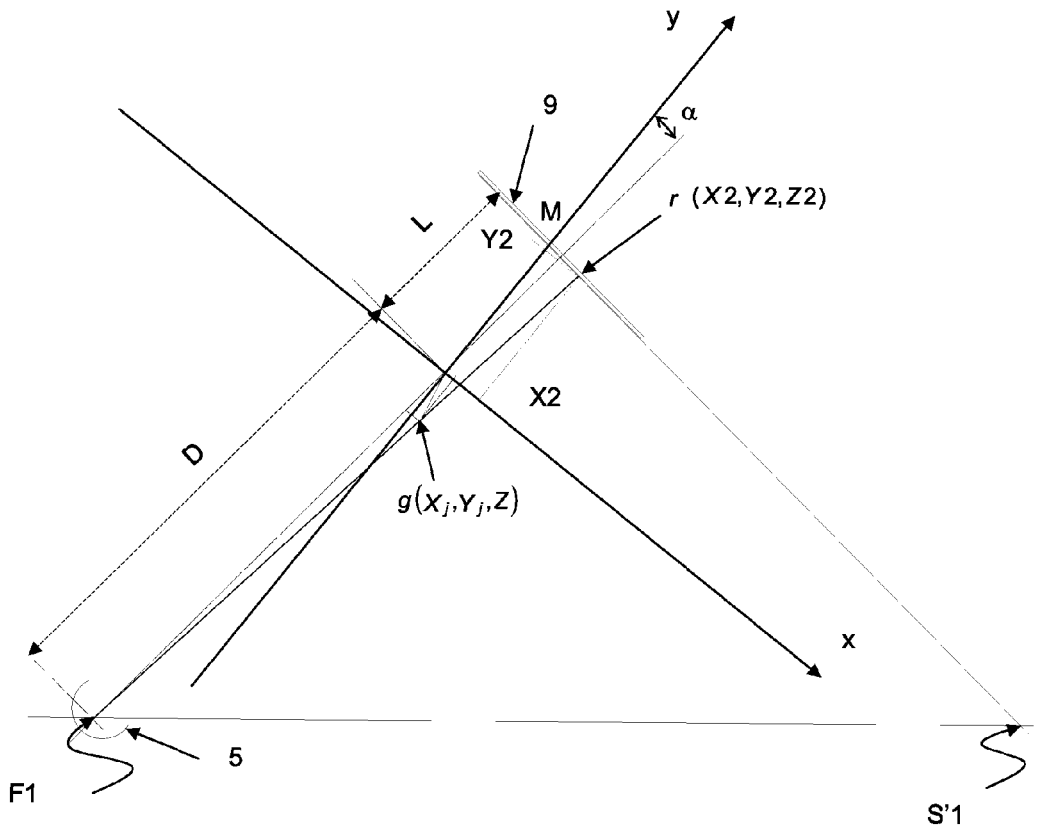
FIG. 12 is a view in the (O, x, y) plane of the geometry of the device shown in FIG. 9, wherein a generic point G is rotated around the rotation axis $\Omega$ by a rotation $\Delta$ whose angle $\alpha$ is higher than 90°.

It should be noted that the formulas for calculating coordinates (X1, Y1, Z1) of impact point T of ray i or (X2,Y2,Z2) of impact point R of ray j generalise to an angular difference Δ between two angular positions different from 90°. FIG. 12 is a view in the (O, x, y) plane of the geometry of the device shown in FIG. 9, wherein generic point G is rotated an angle α in excess of 90° around the rotation axis Ω. In this figure, formulas enabling to calculate coordinates (X2, Y2, Z2) of impact point R of ray j are indicated, depending on angle α. If angle α tends to zero, coordinates (X2, Y2, Z2) tend to those given by the formulas indicated in FIGS. 10 and 11.

Also note that if a ray does not pass through the body to be examined, a zero value is read on the detector at the impact point of the ray. In fact, even in the air, the ray undergoes some attenuation and all values below a certain threshold should be considered as null to account for the air absorption. If a value below this threshold is read at a given point on the detector, it is assumed that the value is zero and that, under these conditions, all values are zero along the ray. If another ray passes through one of those points whose value is zero, it is provided for distributing the value read on the detector for said another ray only among his points where the values are not null. As a result, the read value has to be divided by n−1, instead of n. Similarly, the load associated with the impact point must be calculated by summing the n−1 nonzero values.

The calculation first searches for values assumed to be null for each detected vector or each primary image obtained. Then, one proceeds as follows:

in the calculation made for a point and based on two values read on the detector for two perpendicular rays, the mean value obtained for this point is cancelled;

in the calculation of the subtractive term, the cumulative sum along the load calculation lines is divided $2(n-1)^2$ instead of $2n^2$. If more points are zero, for example, 4 points, one divides by $2(n-4)^2$.

These adjustments have two effects:

improving the image quality—clearly mark the edges of a solid object.

In a calculation based on a 36 images average, it would be useful to start the search for the zero points, to take them into account for the correction factor and the reference values as points of the volume are explored, despite the fact that it may slightly complicates the calculation: the improvement will worth the extra cost.

Where null values appear when processing any of the shots, for example 36, one or more additional calculation cycles are performed under different conditions to account for the results of the previous cycle. Quality of information is increased by choosing another type of point set to each of the 36 shots. For example, the first point set is chosen among parallel horizontal planes. The second set is chosen among vertical planes passing through the rotation axis. This leads to 72 estimates of attenuation coefficients of each point and the quality of the results is measured by analyzing the standard deviation and error rate for 72 points. If necessary, other point sets are chosen, for example among parallel vertical planes or using a series of 45° inclined planes with respect to the rotation axis. The advantage is thus to increase the observations from the same data without increasing the number of shots. it results in higher processing costs but in higher quality as well. It is therefore possible to more easily identify hollow areas inside of the object and not just on the outside. This can be further improved by lowering the null value threshold.

Figure 13:
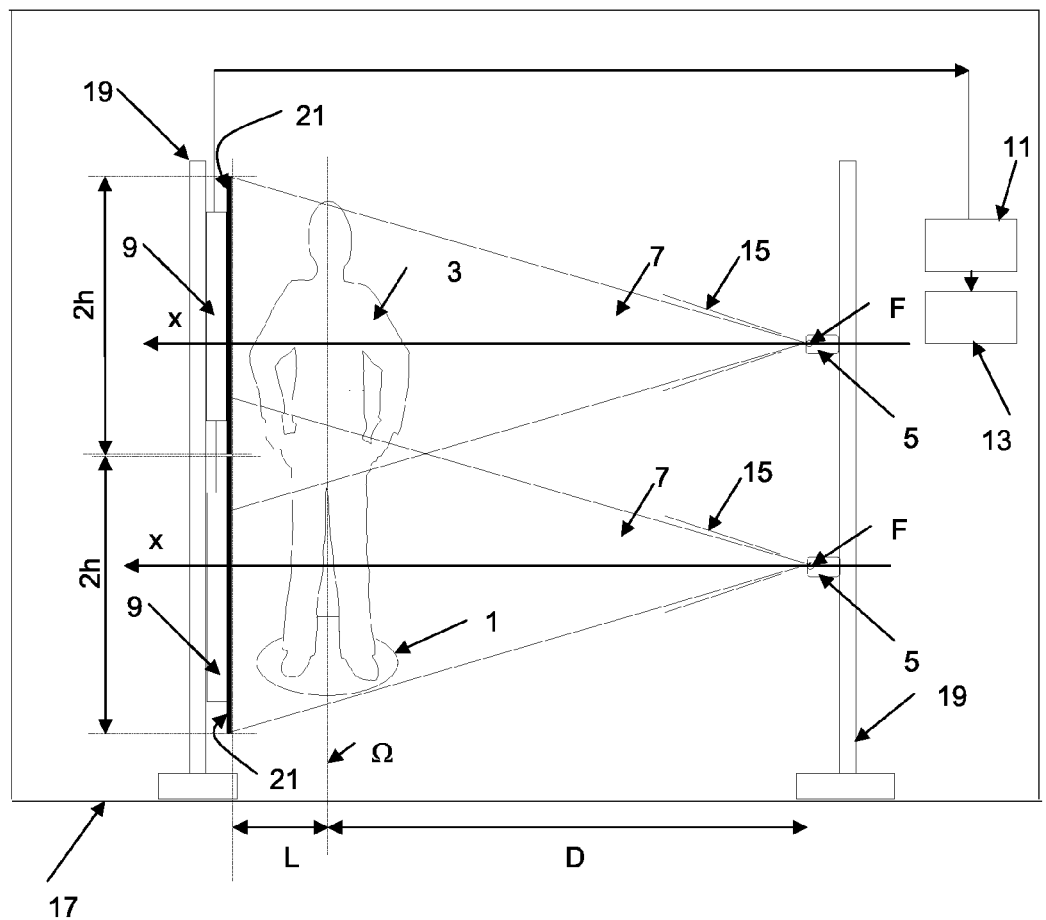
FIG. 13 is a schematic sectional view of a first device designed to implement a method according to the invention.

Two devices designed for the implementation of the X-ray imaging method are described below The first device, FIG. 13, is a so-called "full" scanner which enables in a single pass to obtain initial images of a patient from head to toe. This device comprises:

a 220 cm high cab 17:

a support 1 to receive a patient 3; said support rotates around rotation axis Ω, two sources 5 supplying two focal points F emitting two X-ray beams, two detectors 9 irradiated by the beams to detect an intensity that is attenuated due to the passage of the X-rays through the patient 3, and an analogue to digital converter 11 to convert the detected intensities into data to obtain an image representing a X-ray attenuation coefficient of a set of points belonging to the patient body.

The two sources 5 and two detectors 9 are secured to cab supports 19 and form two superimposed assemblies heightwise, that is to say parallel to the rotation axis Ω. They both illustrate the geometry previously described with reference to FIGS. 6 to 8. Focal points F are arranged on the x-axes perpendicular to the detectors 9. The latter are 2 h=110 cm high. They include one or more detection strips 21 that translate parallel to the y axes to sweep a 2 l=60 cm wide detection area. Focal points F to rotation axis Ω distance D is 150 cm. Detectors 9 to rotation axis Ω distance L is 30 cm.

The patient 3 stands on support 1 and is immobilized by vertical transparent tubes not shown in FIG. 12.

The two sources 5 are, for example, two X-ray tubes with large opening angle, eg 40° or 56°. Taking such a total opening angle of 40°, a 131 cm height can be irradiated at a 180 cm distance. By suitable heights, the tubes can irradiate a height greater than 2 m with an overlap. This overlap may be cancelled by data processing techniques, or minimized by means of a horizontal steel and lead plate disposed mid-height with respect to the detector. A small gap is provided between the plate and the detector for limiting the overlap to a small number of lines easily detectable.

A truncated pyramid concentrator 15 is secured on each tube for the irradiation power surface density to be increased on the detector 9. A X-ray tight plate, not shown in FIG. 13, is provided for sliding in front of the concentrator. Said plate comprises a 2.5 mm wide vertical slot. The detector 9 and the plate move simultaneously to limit the detector irradiation to the 6.6 mm wide detection strip. Under these conditions, the X-ray dose received by the patient 3 is limited by the transit time of the vertical slot. In practice, no patient's point 3 is reached for a time greater than 125 milliseconds. Experiments have shown that for a 46 cm height, the dose received by the patient is much less than 100 micro grays per shot.

The operation is as follows. The patient 3 takes a first angular position $\theta_1$ and a full image is taken by activating the two detectors and the two tubes. An partial image is taken if only a detector and a tube are activated. If the detector comprises several detection strips 21, one or more of these strips move, depending on the patient's area to be examined.

The patient rotates 10° or 18° and a second image is taken in a second angular position $\theta_2$ and so on until 36 or 20 images are taken regularly over 360°. These 36 images will be used to calculate the values of attenuation coefficients at any preselected point P0 of the patient according to the method described above. In practice, a set of 36 reference full images of the patient are stored for later use. These images have a 81 microns basic definition, in other words a height spatial resolution $R_h$ and a width spatial resolution $R_l$ both equal to 81 microns. A full image of the patient with a 162 microns definition can also be obtained in view of obtaining an image with a 81 microns definition for a limited volume, such as orbit, heart, liver, kidney etc. . . . .

A computer system comprising 40 PC in parallel enables 125 mega pixels to be processed per second, that is to say to scan a patient with a 1 mm definition in less than a second. With a 81 microns definition, the overall calculation time is of the order of 1128 seconds. At 162 microns, it is of the order of 141 seconds. To scan a person from head to toe with a 81 microns definition in 4 minutes and to display an image with a 162 microns definition in less than 2 minutes will be standard. It will require 1.6 second to calculate a 125 cm3 volume with a 81 microns definition, for example an eye socket of the patient.

Ultimately, the realization of a full scan will enable the radiologist to work under the following conditions:
- shots lasting 4 minutes, enabling to treat 6 to 10 patients per hour, in an acceptable manner with careful planning of operations,
- display of a total image with a 162 microns definition in less than 2 minutes,
- display of a partial image, such as orbit, heart, liver or the knee joint, in a few tens of seconds, with the possibility of contrast enhancement.

To take the images and to calculate the scans simultaneously enables the radiologist to write his report in real time, based on full or partial high-definition images as required. For example, a secondary cancer in bones is examined by help of a full image with a 162 microns definition, without contrast enhancement.

The device described above includes a computer 13 programmed to perform the steps of the method according to the invention. Specifically, the computer 13 is provided with a mass memory to store the positions of the two impact points T and R of any generic point G of an irradiated volume which contains a human being. If one considers a 2 m high cylinder and a 30 cm radius, the number of positions of the generic point equals $1.06 \cdot 10^{12}$ with a 81 microns definition (number of impact points $2.12 \cdot 10^{12}$). Depending on the part of the patient whose X-ray imaging is desired, the computer takes the relevant information from the mass memory, that is to say the positions of the impact points T and R of the different points P0 of the part of the patient, and transfers them to a random access memory of the computer.

Figure 14:
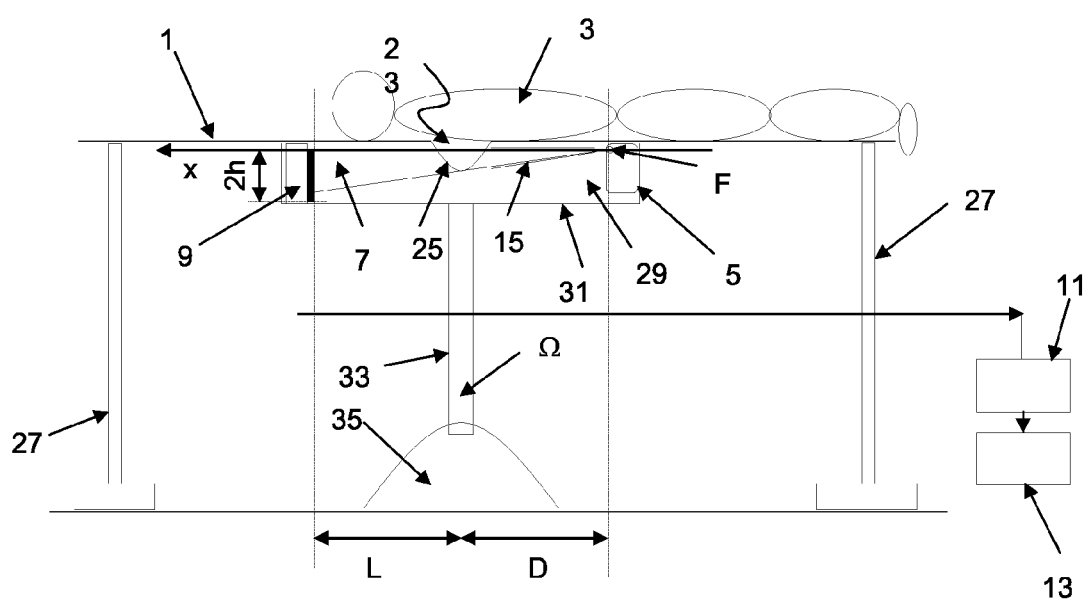
FIG. 14 is a schematic sectional view of a second device designed to implement a method according to the invention.

The second device, FIG. 14, is a scanner for X-ray breast imaging. This device comprises:
- an table to receive a patient 3, provided with an opening 23 to enable the breast of the patient to be housed in a X-ray transparent shell 25 designed to slightly compress or suck the breast so as the skin comes into contact with the shell in order to immobilize the breast,
- a source 5 supplying a focal point F emitting a X-ray beam 7,
- a detector 9 which is irradiated by the beam to detect an intensity that is attenuated due the passage of the X-rays through the breast of the patient 3, and an analogue to digital converter 11 to convert the intensities detected into data to obtain an image representing a X-ray attenuation coefficient of a set of points P0 of the patient's breast.

The table 1 is supported by two supports 27. The source 5—detector 9 assembly rotates about the rotation axis $\Omega$. They both are secured to a cylindrical cage 29 with a circular base 31 driven in rotation via a shaft 33 and a motor 35. The cage includes a top wall, a bottom wall and a side wall made of lead to absorb the X-rays and prevent them to propagate outside. They illustrate the geometry previously described with reference to FIGS. 6 to 8, wherein the source—detector assembly rotates and the support is fixed. Source 5 is for example a low power tube, typically a few milliamps at a voltage of 75 kV. Focal point F is arranged on the x-axis perpendicular to the detector 9. The latter consists of a detection plate 37, 23 cm high and 30 cm wide and has a definition of 162 microns. The focal point F to the rotation axis $\Omega$ distance D equals 37.5 cm. The detector 9 to the rotation axis $\Omega$ distance L equals 37.5 cm.

FIG. 14, the focal point F is preferably arranged in a plane perpendicular to the rotation axis $\Omega$ and containing the top S of the detector 9 arranged just below the table 1. This half-field arrangement enables to irradiate a large height of the breast without excessively increasing the opening angle of the concentrator 15 attached to the X-ray tube. But the focal point F may also be arranged in the median plane, that is to say in the plane perpendicular to the rotation axis $\Omega$ and passing by the mid-height of the detector.

The operation is as follows. A first image is taken in a first angular position $\theta_1$ of the source—detector assembly. The cage then rotates 10° or 18° and a second image is taken in a second angular position $\theta_2$ and so on until 36 or 20 images are taken regularly over 360°. These 36 images will be used to calculate the values of attenuation coefficients at any point P0 of the patient. A set of 36 reference images of the entire breast are stored for later use. In the example above, each image is 30 cm wide and the 36 images overlap.

The device described above includes a computer 13 programmed to perform the steps of the method according to the invention. Specifically, the computer 13 is provided with a fast access memory to store the positions of the two impact points T and R of any generic point G belonging to an irradiated volume containing a breast. If one considers a hemispherical shell with a radius of 15 cm, for a 162 microns definition, the number of positions of the generic point equals $2.8 \cdot 10^8$ (number of impact points $5.6 \cdot 10^8$). The computer takes the relevant information from the fast access memory, namely the positions of the impact points T and R of the different points P0 of the patient's breast and transfers them to a random access memory of the computer.

When the method according to the invention is used to examine a small body like liver or heart, close tissue may have close values. Under these conditions, it is interesting to make a contrast zoom based on the following principle: the attenuation coefficient value at a point is raised to a power between 1.2 and 1.8 for example. Contrast amplification is as follows: the lowest absorption level is 10, the highest level is 100, the contrast equals 10 without amplification, and where an exponent equal to 1.5 is used, the lowest level equals 31.62, the highest level equals 1000 and contrast amplification is 31.62.

It should be noted that in the embodiments described above, the detector may comprise a scintillation sensor, a optic fibre network and photodiode sensors. The converter preferably is an analogue-digital converter. However, the invention may also be carried out by means of detectors such as X-ray photographic films. In this case, the digital converter is used to scan the X-ray photographic films.

The invention claimed is:

1. X-ray imaging method, in which a body to be examined is received by a support and in which,
   - a X-ray beam is emitted from a focal point of a source towards the body,
   - an intensity is attenuated due to the passage of the X-rays through the body and detected by a detector irradiated by the beam, for different pairs of angular positions taken by the body or the source—detector assembly around a rotation axis, said two angular positions of said different pairs having an angular difference, the detected intensities are converted into data by a digital converter and, the data are processed by a programmed computer by using the following formula:

$$C = \frac{\rho^{(b)}}{n} + \frac{c^{(a)}}{n} - \frac{1}{2n^2}\left(\sum_{k=1}^{n} c_k^{(a)} + \sum_{u=1}^{n} \rho_u^{(b)}\right)$$

to calculate a value C of the attenuation coefficient at a point P0 of a set of points {P0}, for a given pair of said angular positions, in order to obtain an image representing an X-ray attenuation coefficient for said set of points {P0} of the body, where, in the formula:

$c^{(a)}$ is the data coming from the intensity detected at an impact point $T^{(a)}$ of a first ray i passing through said point P0 for said first angular position $\theta_a$, $\rho^{(b)}$ is the data coming from the intensity detected at an impact point $R^{(b)}$ of a second ray j passing through said point P0 for said second angular position $\theta_b$, $$\sum_{k=1}^{n} c_k^{(a)}$$

is the load associated with said first ray impact point $T^{(a)}$, defined by the sum of data $c_k^{(a)}$ coming from intensities detected in the first angular position $\theta_a$, along n points $T_k^{(a)}$ of a first load calculation line passing closest to said first impact point $T^{(a)}$, and $$\sum_{u=1}^{n} \rho_u^{(b)}$$

is the load associated with said second ray impact point $R^{(b)}$, defined by the sum of data $\rho_u^{(b)}$ coming from the intensities detected in the second angular position $\theta_b$, along n points $R_u^{(b)}$ of a second load calculation line passing closest to said second impact point $R^{(b)}$, wherein the computer is programmed to perform the following steps:

(1) pre-calculate, for any generic point of a volume irradiated by the beam emitted by the source, the positions on the detector of a first impact point $T^{(a)}$ of a ray i and a second impact point $R^{(b)}$ of a ray j, the two rays i and j passing through the generic point and corresponding to one another by a rotation of either the generic point or the source—detector assembly around the rotation axis Ω, whose angle equals the angular difference Δ between the two angular positions $\theta_a$ and $\theta_b$ of said different pairs of said angular positions of the body or the source—detector assembly around the rotation axis, (2) pre-calculate the positions on the detector of first and second load calculation lines, along detection points $T_{p,k}$; k=1→n; p=1→m and $R_{q,u}$; u=1→n; q=1→m, said load calculation lines converging respectively in a first geometrical point and a second geometrical point whose positions are determined by the focal point—rotation axis distance and the detector—rotation axis distance, each load calculation line being inclined with respect to the rotation axis with a slope angle $\gamma_p$ or $\gamma_q$ which runs a series of discrete values determined by a spatial resolution of the detector parallel to the rotation axis, (3) calculate the value of the attenuation coefficient at point P0 in the volume irradiated by the beam by using the pre-calculated positions of the first and second impact points $T^{(a)}$; $R^{(b)}$ and the pre-calculated first p and second q load calculation lines $T_{p,k}^{(a)}$; k=1→n; $R_{q,u}^{(b)}$; u=1→n that pass closest to the first and second impact points ($T^{(a)}$; $R^{(b)}$) respectively, (4) repeat step (3) for said different pairs of angular positions $\theta_a$ and $\theta_b$ taken by the body or the source—detector assembly around the rotation axis and calculate a mean value <C> of the attenuation coefficient at point P0 for said different pairs of angular positions, and (5) repeat step (4) and display on the computer screen the image representing the mean values <C> of the set of points {P0}.

2. X-ray imaging method according to claim 1, wherein the computer 13 is programmed to perform step (3) with two additional steps.

(6) pre-calculate the position on the detector 9 of a first reference point T* in connection with the first impact point, at the intersection of the line passing through first geometric convergence point S1 (−(D+L) L, 0) and first impact point T (X1, L, Z1) with a line of detection points, parallel to the rotation axis and along which the discrete values of the slope angles $\gamma_p$ of the m first calculation load lines $T_{p,k}$; k=1→n; p=1→m are incremented, and allocate the first impact point T with the load calculated along the load calculation line p that passes closest to the reference point T* and, (7) pre-calculate the position on the detector 9 of a second reference point R* in connection with the second impact point, at the intersection of the line passing through the second geometrical convergence point S2 (D+L, L, 0) and the second impact point R (L, Y2, Z2) with a line of detection points, parallel to the rotation axis Ω and along which the discrete values of the slope angles $\gamma_q$ of the m second load calculation lines $R_{q,u}$; u=1→n; q=1→m are incremented, and allocate the second impact point R with the load calculated along the load calculation line q that passes closest to the reference point R*.

3. X-ray imaging method according to claim 1 or 2, wherein the computer is programmed to perform step (2) or steps (6) and (7) by using the detector edge which is opposite to the first or the second geometric convergence point associated with the first, respectively the second load calculation lines, as the line of detection points along which the discrete values of the slope angles of the first, respectively the second load calculation lines are incremented.

4. X-ray imaging method according to claim 1 or 2, wherein the computer 13 is programmed to perform step (5) with the following additional steps:

(8) pre-calculate a first and second load vectors whose terms are given by the loads $$\sum_{k=1}^{n} c_{p,k}^{(a)} \text{ and } \sum_{u=1}^{n} \rho_{q,u}^{(b)}$$

along the m first, respectively the m second load calculation lines, for the two angular positions $\theta_a$ and $\theta_b$ of each pair of different angular positions, and (9) calculate the attenuation coefficient of any point P0 by recalling the terms of the two load vectors pre-calculated along the two load calculation lines that pass closest the two impact points $T^{(a)}$ et $R^{(b)}$ associated with said point P0, for each pair of different angular positions.

5. X-ray imaging method according to claim 1, wherein the angular difference recited in step (1) corresponds to two angular positions successively taken by the body or the source—detector assembly around the rotation axis.

6. X-ray imaging method according to claim 1, wherein the angular difference recited in step (1) corresponds to two angular positions simultaneously taken by the body or the source—detector assembly around the rotation axis.

7. Non-transitory computer-readable medium encoded with a computer programme to process data ($c^{(a)}$, $\rho^{(b)}$) using the following formula:

$$C = \frac{\rho^{(b)}}{n} + \frac{c^{(a)}}{n} - \frac{1}{2_n 2}\left(\sum_{k=1}^{n} c_k^{(a)} + \sum_{u=1}^{n} \rho_u^{(b)}\right)$$

where, in the formula:

$c^{(a)}$ is the data coming from the intensity detected by a detector at a first impact point $T^{(a)}$ of a first X-ray i passing through a point P0 of a body to be examined for a first angular position $\theta_a$, taken by the body or a source—detector assembly around a rotation axis, $\rho^{(b)}$ is the data coming from the intensity detected by a detector at a second impact point $R^{(b)}$ of a second X-ray j passing through said point P0 for a second angular position $\theta_b$, $$\sum_{k=1}^{n} c_k^{(a)}$$

is the load associated with said first ray impact point $T^{(a)}$, defined by the sum of data $c_k^{(a)}$ coming from intensities detected in the first angular position $\theta_a$, along n points $T_k^{(a)}$ of a first load calculation line passing closest to said first impact point $T^{(a)}$, and $$\sum_{u=1}^{n} \rho_u^{(b)}$$

is the load associated with said second ray impact point $R^{(b)}$, defined by the sum of data $\rho_u^{(b)}$ coming from the intensities detected in the second angular position $\theta_b$, along n points $R_u^{(b)}$ of a second load calculation line passing closest to said second impact point $R^{(b)}$, and C is a value that represents an attenuation coefficient at point P0, for the given pair of said angular positions $\theta_a$ and $\theta_b$, in order to obtain an image representing an X-ray attenuation coefficient for said a set of points {P0} of the body, wherein the computer programme contains the following stages:

(1) pre-calculate, for any generic point of a volume that represents a volume irradiated by the beam emitted by the source, two points that represent the positions on the detector of a first impact point $T^{(a)}$ of a ray i and a second impact point $R^{(b)}$ of a ray j on the detector, the two rays and j passing through the generic point and corresponding to one another by a rotation of either the generic point or the source—detector assembly around the rotation axis $\Omega$, whose angle equals the angular difference $\Delta$ between the two angular positions $\theta_a$ and $\theta_b$ of said different pairs of said angular positions of the body or the source—detector assembly around the rotation axis $\Omega$, (2) pre-calculate two sets of lines that represent the positions on the detector of first and second load calculation lines, along detection points $T_{p,k}$; k=1→n; p=1→m and $R_{q,u}$; u=1→n; q=1→m, said load calculation lines converging respectively in a first geometrical point and a second geometrical point whose positions are determined by the source focal point—rotation axis distance and the detector—rotation axis distance, each load calculation line being inclined with respect to the rotation axis with a slope angle $\gamma_p$ or $\gamma_q$ which runs a series of discrete values determined by a spatial resolution of the detector parallel to the rotation axis, (3) calculate the value C of the attenuation coefficient at point P0 in the volume irradiated by the beam by using the pre-calculated positions of the first and second impact points $T^{(a)}$; $R^{(b)}$ and the pre-calculated first p and second q load calculation lines $T_{p,k}^{(a)}$; k=1→n; $R_{q,u}^{(b)}$; u=1→n that pass closest to the first and second impact points ($T^{(a)}$; $R^{(b)}$) respectively, (4) repeat step (3) for data obtained for said different pairs of angular positions ($\theta_a$,$\theta_b$) taken by the body or the source—detector assembly around the rotation axis and calculate a mean value <C> of the attenuation coefficient at point P0 for said different pairs of angular positions, and (5) repeat step (4) and display on the computer screen the image representing the mean values <C> of the set of points {P0}.

8. Non-transitory computer-readable medium according to claim 7, wherein the computer programme further contains the following stages to perform stage (3):

(6) pre-calculate a point that represents the position on the detector 9 of a first reference point T* in connection with the first impact point, at the intersection of the line passing through first geometric convergence point S1 (−(D+L) L, 0) and first impact point T (X1, L, Z1) with a line of detection points, parallel to the rotation axis $\Omega$ and along which the discrete values of the slope angles $\gamma_p$ of the m first calculation load lines $T_{p,k}$; k=1→n; p=1→m are incremented, and allocate the first impact point T with the load calculated along the load calculation line p that passes closest to the reference point T* and, (7) pre-calculate a point that represents the position on the detector 9 of a second reference point R in connection with the second impact point, at the intersection of the line passing through the second geometrical convergence point S2 (D+L, L, 0) and the second impact point R (L, Y2, Z2) with a line of detection points, parallel to the rotation axis $\Omega$ and along which the discrete values of the slope angles $\gamma_q$ of the m second load calculation lines $R_{q,u}$; u=1→n; q=1→m are incremented, and allocate the second impact point R with the load calculated along the load calculation line q that passes closest to the reference point R*.

9. Non-transitory computer-readable medium according to claim 7, wherein the computer programme further contains the following stages to perform stage (5):
- (8) pre-calculate two vectors that represent a first and second load vectors whose terms are given by the loads $$\sum_{k=1}^{n} c_{p,k}^{(a)} \text{ and } \sum_{u=1}^{n} \rho_{q,u}^{(b)}$$

along the m first, respectively the m second load calculation lines, for the two angular positions $\theta_a$ and $\theta_b$ of each pair of different angular positions, and
- (9) calculate the value C that represents the attenuation coefficient of any point P0 by recalling the terms of the two load vectors pre-calculated along the two load calculation lines that pass closest the two impact points $T^{(a)}$ et $R^{(b)}$ associated with said point P0, for each pair of different angular positions.

* * * * *